United States Patent
Priede

(10) Patent No.: US 9,693,049 B2
(45) Date of Patent: Jun. 27, 2017

(54) PROJECTION MAPPING VIDEO PIPELINE

(71) Applicant: CHRISTIE DIGITAL SYSTEMS USA, INC., Cypress (CA)

(72) Inventor: Jordan Evalds Huxley Priede, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 50 days.

(21) Appl. No.: 14/838,455

(22) Filed: Aug. 28, 2015

(65) Prior Publication Data

US 2017/0064294 A1 Mar. 2, 2017

(51) Int. Cl.
| | |
|---|---|
| H04N 13/04 | (2006.01) |
| G06T 19/00 | (2011.01) |
| H04N 9/31 | (2006.01) |
| G06T 1/60 | (2006.01) |
| G06T 3/00 | (2006.01) |
| G06T 15/04 | (2011.01) |
| G06T 15/20 | (2011.01) |

(52) U.S. Cl.
CPC ......... *H04N 13/0459* (2013.01); *G06T 1/60* (2013.01); *G06T 3/0037* (2013.01); *G06T 15/04* (2013.01); *G06T 15/20* (2013.01); *G06T 19/006* (2013.01); *H04N 9/3147* (2013.01); *H04N 9/3185* (2013.01); *G06T 2200/04* (2013.01)

(58) Field of Classification Search
CPC .................................................. H04N 13/0275
USPC ....................................................... 345/419
See application file for complete search history.

(56) References Cited

U.S. PATENT DOCUMENTS

| 6,709,116 B1 | 3/2004 | Raskar et al. |
| 2006/0152680 A1 | 7/2006 | Shibano |
| 2012/0230566 A1* | 9/2012 | Dean ................. G06T 19/00 382/131 |

(Continued)

FOREIGN PATENT DOCUMENTS

JP 2014089327 A 5/2014

OTHER PUBLICATIONS

Nguyen et al.."Depth image-based rendering from multiple cameras with 3D propagation algorithm", IMMERSCOM '09 Proceedings of the 2nd International Conference on Immersive Telecommunications, 6 pages, May 2009.*

(Continued)

*Primary Examiner* — Thomas Lett
(74) *Attorney, Agent, or Firm* — Perry + Currier, Inc.

(57) ABSTRACT

A projection mapping video pipeline is provided including a system comprising: a lookup table generator; a memory and a communication interface, the memory storing: a three-dimensional ("3D") model of a physical object; and a mapping of the 3D model onto unwrapped two-dimensional ("2D") surfaces of the 3D model; the lookup table generator configured to: receive projector data defining a location, an orientation and lens characteristics associated with a given projector, relative to the physical object; generate a lookup table from the 3D model, the mapping and the projector data, the lookup table comprising a respective mapping of projector pixels to the unwrapped 2D surfaces of the 3D model, respective to the given projector; and, transmit, using the communication interface, the lookup table to a given control device in communication with the given projector.

18 Claims, 15 Drawing Sheets

(56) References Cited

U.S. PATENT DOCUMENTS

2014/0267257 A1* 9/2014 Overbeck .............. G06T 17/05
                                                      345/422
2015/0172634 A1   6/2015 Wheeler et al.
2015/0187126 A1   7/2015 Magder et al.

OTHER PUBLICATIONS

Partial European Search Report dated Feb. 8, 2017 for European Patent Application No. 16185114.2.
Dataton: "Dataton Showcases WATCHOUT 6 at InfoComm15" Jun. 11, 2015 (Jun. 11, 2015), XP055337543, Retrieved from the Internet: URL:https://www.dataton.com/press/dataton-showcases-watchout-6-at-infocomm-15.
Dataton: "Dataton WATCHOUT 6 Oveeview", Jun. 4, 2015 (Jun. 4, 2015) pp. 1-3, XP054977109, Retrieved from the Internet: URL:https://vimeo.com/129773549.
Dataton: 3D Projection Mapping Basics, May 8, 2015 (May 8, 2015), pp. 1-2, XP054977110, Retrieved from the internet: URL:https://vimeo.com/127296572 (retrieved on Jan. 26, 2017).
Dataton 3D Mapping with Multiple Projectiors, May 10, 2015 (May 10, 2015), pp. 1-2, XP054977111, retrieved from the internet: URL:https://vimeo.com/127395953.
Dataton: "3D Texturing" May 7, 2015 (May 7, 2015), XP055341151, Retrieved from the Internet: URL:https://vimeo.com/127157056 (retrieved on Feb. 1, 2017).
Anonymous: 3D Technologies/Features—Projector Simulation:, Mar. 30, 2015 (Mar. 30, 2015) XP055337518, Retrieved from the Internet: URL:http://web.archive.org/web/20150330144818/htttp://www.d3technologies.com/features/projector_simulation (retrieved on Jan. 20, 2017) whole document.

\* cited by examiner

```
┌─────────────────────────────────────────────────────────────┐
│   Receive Projector Data Defining A Location, An Orientation And Lens │
│   Characteristics Associated With A Given Projector, Relative To The  │
│                         Physical Object                      │
│                              201                             │
└─────────────────────────────────────────────────────────────┘
                              ▼
┌─────────────────────────────────────────────────────────────┐
│  Generate A Lookup Table From The 3D Model, The Mapping And The │
│  Projector Data, The Lookup Table Comprising A Respective Mapping Of │
│  Projector Pixels To The Unwrapped 2D Surfaces Of The 3d Model, │
│              Respective To The Given Projector              │
│                              203                             │
└─────────────────────────────────────────────────────────────┘
                              ▼
┌─────────────────────────────────────────────────────────────┐
│   Transmit, Using The Communication Interface, The Lookup Table To A │
│     Given Control Device In Communication With The Given Projector │
│                              205                             │
└─────────────────────────────────────────────────────────────┘
```

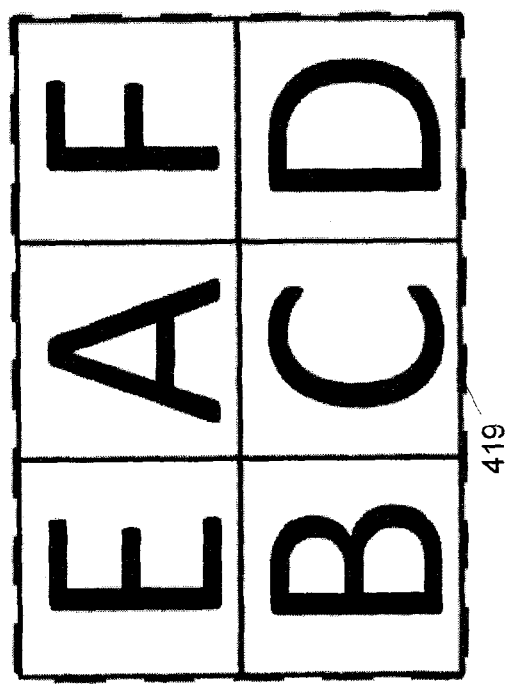
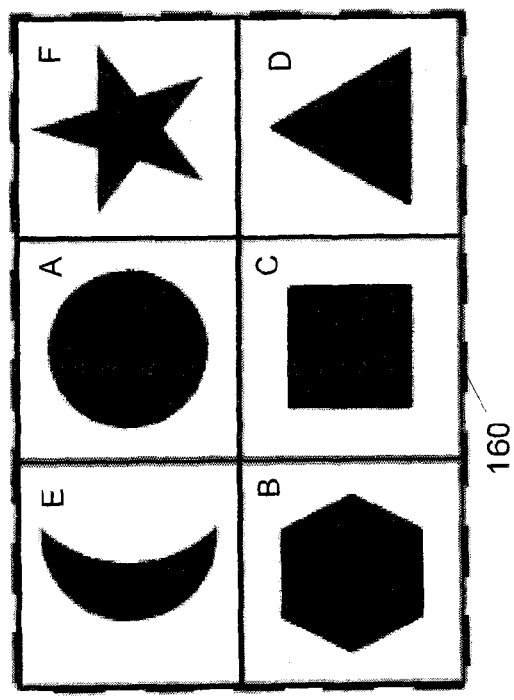
Fig. 11

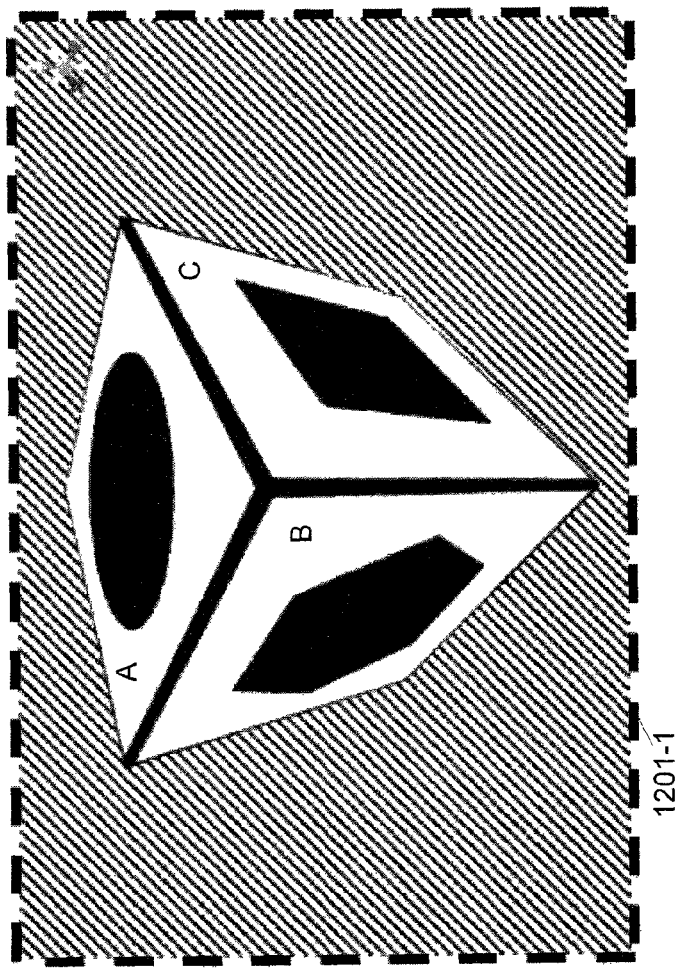
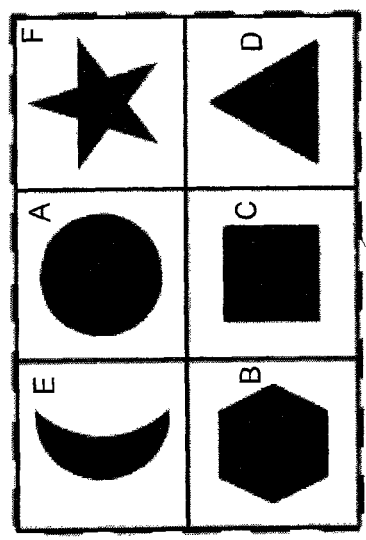
Fig. 12

PROJECTION MAPPING VIDEO PIPELINE

FIELD

The specification relates generally to projectors, and specifically to a projection mapping video pipeline.

BACKGROUND

Furthermore, projection mapping onto a target surface of physical object using one projector generally results in poor coverage of the target surface. Mapping onto target surfaces having a complex shape generally uses multiple projectors from multiple locations in order to cover the entire target surface. Each of these projectors would require an additional video signal, which means that unique rendered content and/or video must be generated for each unique projector. Hence, the cost of rendering/cost of real-time rendering video scales directly with the number of projectors used. So, while many cheaper projectors would be ideal, cost and brightness specifications generally imply use of fewer, brighter projectors.

Additionally, pre-rendered video content would be re-created when the relationship between a projector and the target object changes. Indeed, if the object moves, the pre-rendered video would be recreated for each of the projectors. Hence, when a projector moves, or the object being projected upon moves, the images in the video would need to be rendered again (and/or pre-rendered content would again need to be pre-rendered) to account for the new relative positioning, which makes heavy use of processing resources and further is quite slow. Furthermore, such systems generally require a one-to-one video-to-projector ratio (e.g. "N" videos for "N" projectors).

SUMMARY

In general, this disclosure is directed to a system that enables the dissociation of a one-to-one video-to-projector ratio for projection of images and/or video onto a target object. Such a single video, representing a 2D texture map, can be distributed to all control devices associated, in a one-to-one relationship, with the projectors in the system where the control devices each performing a 2D lookup function to create unique content for projection. The system hence can simplify pre-rendered video distribution for projection mapping, as well as real-time applications. Upgradeability can hence also be simplified, as only the main video source would need upgrading, and not videos for each of the projectors as is presently done.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a system comprising: a lookup table generator; a memory and a communication interface, the memory storing: a three-dimensional ("3D") model of a physical object; and a mapping of the 3D model onto unwrapped two-dimensional ("2D") surfaces of the 3D model; the lookup table generator configured to: receive projector data defining a location, an orientation and lens characteristics associated with a given projector, relative to the physical object; generate a lookup table from the 3D model, the mapping and the projector data, the lookup table comprising a respective mapping of projector pixels to the unwrapped 2D surfaces of the 3D model, respective to the given projector; and, transmit, using the communication interface, the lookup table to a given control device in communication with the given projector.

The lookup table generator can be further configured to generate the lookup table by: determining, from the 3D model and the mapping, for the projector pixels in a view of the given projector, source coordinates of a texture map, the view determined from the projector data.

The lookup table generator can be further configured to generate the lookup table taking into account one or more of blending and warping.

The system can further comprise the given control device, the given control device storing 2D texture data comprising images associated with each of the unwrapped 2D surfaces of the 3D model, the given control device further configured to: generate a respective image to be projected onto the physical object by the projector by using the lookup table to associate portions of the 2D texture data with the projector pixels.

The system can further comprise a plurality of control devices, including the given control device, in a one-to-one relationship with a plurality of projectors, including the given projector, each of the plurality of control devices storing the 2D texture data, which is common to all of the plurality of control devices, the lookup table generator further configured to, for each of the plurality of control devices: receive respective projector data defining a respective location, a respective orientation and respective lens characteristics associated with an associated given projector, relative to the physical object; generate a respective lookup table for a respective control device from the 3D model, the mapping and the respective projector data, the respective lookup table comprising a respective mapping of respective projector pixels to the unwrapped 2D surfaces of the 3D model, for the respective associated projector; and, transmit, using the communication interface, the respective lookup table to the respective control device.

The 3D model can comprise one or more of a 3D mesh and a plurality of triangles representing the 3D mesh.

The projector data can be received from an optical vision system configured to determine the projector data.

The system can further comprise an input device, and wherein the projector data is received from the input device.

The lookup table generator can be further configured to receive the 3D model and the mapping from an image generator.

The system can further comprise an image generator configured to generate 2D texture data comprising images associated with each of the unwrapped 2D surfaces of the 3D model and transmit the 2D texture data to each of one or more control devices associated, in a one-to-one relationship, with a plurality of projectors, the one or more control devices including the given control device, and the plurality of projectors including the given projector. The system can further comprise a computing device comprising the lookup table generator, the memory, the communication interface and the image generator, the computing device in communication with each of the one or more control devices. The 2D texture data can comprise a baked UV texture map. The 2D texture data can comprise video.

The image generator can comprises a real-time image generator or a pre-rendered image generator. When the image generator comprises the pre-rendered image generator, the system further can comprise a media player.

Another aspect of the present specification provides a method comprising: at a system comprising: a lookup table generator; a memory and a communication interface, the memory storing: a three-dimensional ("3D") model of a physical object; and a mapping of the 3D model onto unwrapped two-dimensional ("2D") surfaces of the 3D model, receiving, at the lookup table generator, projector data defining a location, an orientation and lens characteristics associated with a given projector, relative to the physical object; generating, at the lookup table generator, a lookup table from the 3D model, the mapping and the projector data, the lookup table comprising a respective mapping of projector pixels to the unwrapped 2D surfaces of the 3D model, respective to the given projector; and, transmitting, using the communication interface, the lookup table, from the lookup table generator, to a given control device in communication with the given projector.

The method can further comprise generating the lookup table by: determining, from the 3D model and the mapping, for the projector pixels in a view of the given projector, source coordinates of a texture map, the view determined from the projector data.

The method can further comprise generating the lookup table by taking into account one or more of blending and warping.

The system can further comprise the given control device, the given control device storing 2D texture data comprising images associated with each of the unwrapped 2D surfaces of the 3D model, and the method can further comprise, generating, at the given control device, a respective image to be projected onto the physical object by the projector by using the lookup table to associate portions of the 2D texture data with the projector pixels.

The system can further comprise a plurality of control devices, including the given control device, in a one-to-one relationship with a plurality of projectors, including the given projector, each of the plurality of control devices storing the 2D texture data, which is common to all of the plurality of control devices, and the method can further comprise, for each of the plurality of control devices: receiving, at the lookup table generator, respective projector data defining a respective location, a respective orientation and respective lens characteristics associated with an associated given projector, relative to the physical object; generating, at the lookup table generator, a respective lookup table for a respective control device from the 3D model, the mapping and the respective projector data, the respective lookup table comprising a respective mapping of respective projector pixels to the unwrapped 2D surfaces of the 3D model, for the respective associated projector; and, transmitting, using the communication interface, the respective lookup table from the lookup table generator to the respective control device.

The 3D model can comprise one or more of a 3D mesh and a plurality of triangles representing the 3D mesh.

The method can further comprise receiving the projector data from an optical vision system configured to determine the projector data.

The system can further comprise an input device, and the method can further comprise receiving the projector data from the input device.

The method can further comprise receiving the 3D model and the mapping from an image generator.

The system of can further comprise an image generator, and the method can further comprise: generating, at the image generator, 2D texture data comprising images associated with each of the unwrapped 2D surfaces of the 3D model; and transmitting the 2D texture data to each of one or more control devices associated, in a one-to-one relationship, with a plurality of projectors, the one or more control devices including the given control device, and the plurality of projectors including the given projector. The system can further comprise a computing device comprising the lookup table generator, the memory, the communication interface and the image generator, the computing device in communication with each of the one or more control devices. The 2D texture data can comprise a baked UV texture map. The 2D texture data can comprise video.

Another aspect of the present specification provides a method comprising a computer-readable medium storing a computer program, wherein execution of the computer program is for: at a system comprising: a lookup table generator; a memory and a communication interface, the memory storing: a three-dimensional ("3D") model of a physical object; and a mapping of the 3D model onto unwrapped two-dimensional ("2D") surfaces of the 3D model, receiving, at the lookup table generator, projector data defining a location, an orientation and lens characteristics associated with a given projector, relative to the physical object; generating, at the lookup table generator, a lookup table from the 3D model, the mapping and the projector data, the lookup table comprising a respective mapping of projector pixels to the unwrapped 2D surfaces of the 3D model, respective to the given projector; and, transmitting, using the communication interface, the lookup table, from the lookup table generator, to a given control device in communication with the given projector. The computer-readable medium can comprise a non-transitory computer-readable medium.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 2 depicts a flowchart of a method of generating a lookup table, according to non-limiting implementations.

FIG. 11 depicts a 2D texture map alongside the corresponding mapping of unwrapped 2D surfaces if the 3D model, according to non-limiting implementations.

FIG. 12 depicts generation of an image for projection, according to non-limiting implementations.

DETAILED DESCRIPTION

Figure 1:
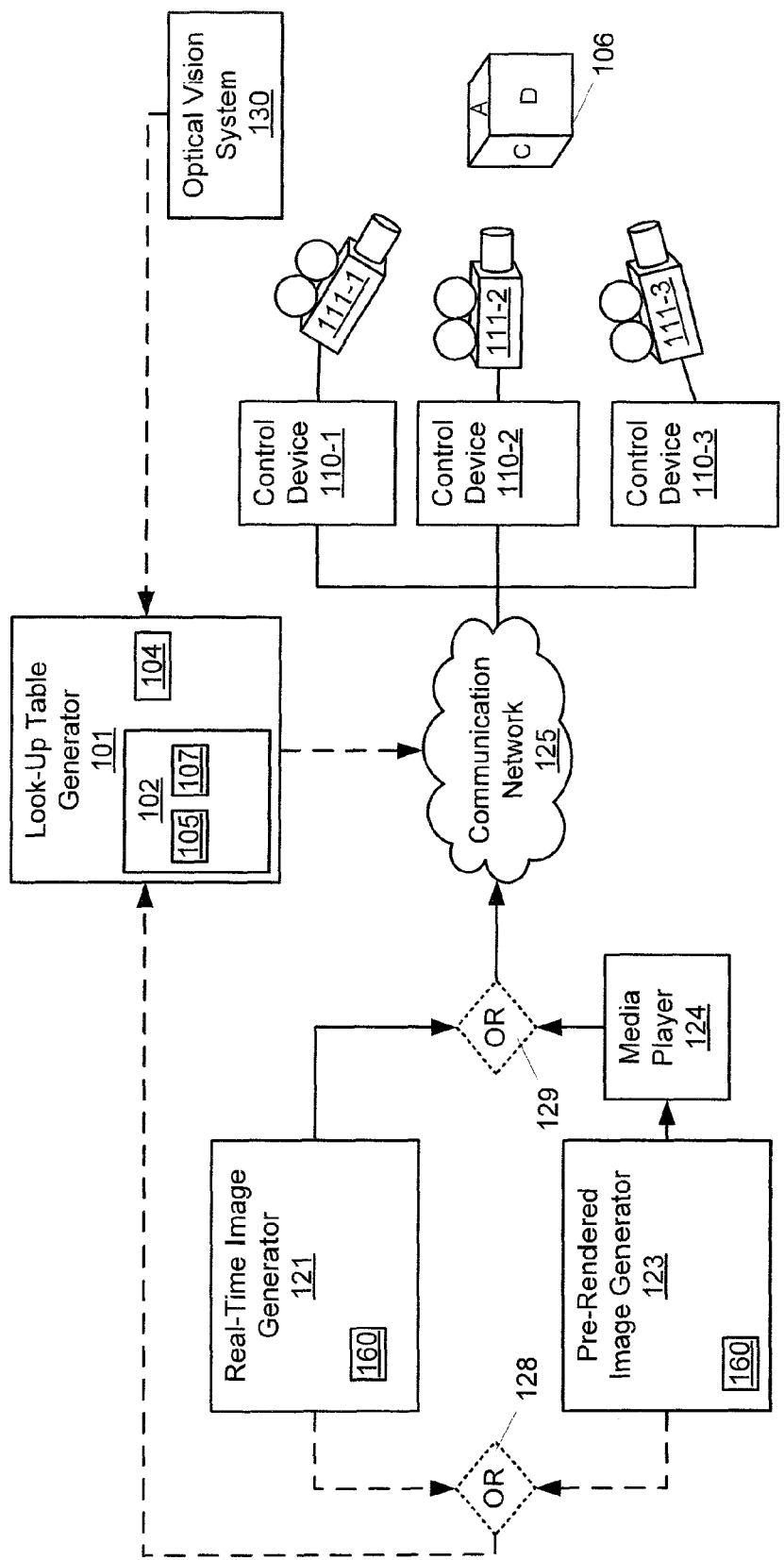
FIG. 1 depicts a projection system, according to non-limiting implementations.

FIG. 1 depicts a system 100 comprising: a lookup table generator 101; a memory 102 and a communication interface 104, the memory storing: a three-dimensional ("3D") model 105 of a physical object 106; and a mapping 107 of 3D model 105 onto unwrapped two-dimensional ("2D") surfaces of the 3D model; lookup table generator 101 configured to: receive projector data defining a location, an orientation and lens characteristics associated with a given projector, relative to physical object 106; generate a lookup table from 3D model 105, mapping 107 and the projector data, the lookup table comprising a respective mapping of projector pixels to the unwrapped 2D surfaces of the 3D model, respective to the given projector; and, transmit, using the communication interface 104, the lookup table to a given control device in communication with the given projector.

System 100 further comprises a plurality of control devices 110-1, 110-2, 110-3, including the given control device (e.g. one or more of control devices 110-1, 110-2, 110-3 comprise a given control device that receives a lookup table from lookup table generator 101), in a one-to-one relationship with a plurality of projectors 111-1, 111-2, 111-3, including the given projector.

Lookup table generator 101 will be interchangeably referred to hereafter as generator 101. Plurality of control devices 110-1, 110-2, 110-3 will be interchangeably referred to hereafter, collectively, as control devices 110 and, generically, as a control device 110. Plurality of projectors 111-1, 111-2, 111-3 will be interchangeably referred to hereafter, collectively, as projectors 111 and, generically, as a projector 111.

System 100 can further comprise one or more of a real-time image generator 121 and a pre-rendered image generator 123, the pre-rendered image generator 123 in communication with a media player 124. In general, components of system 100 can be in communication using a communication network 125 (interchangeably referred to hereafter as network 125); in particular, generator 101, can be in communication with control devices 110 using network 125, and real-time image generator 121 and media player 124 (and/or pre-rendered image generator 123) can be in communication with control devices 110 using network 125.

Alternatively, pre-rendered image generator 123 can be replaced with a memory and and/or a device (not depicted) storing rendered images; such a memory can include, but is not limited to a flash drive (e.g. a USB (Universal Serial Bus) drive), a hard-drive, a personal computer, and the like. For example, any device which stores pre-rendered images is within the scope of present implementations. Indeed, in some implementations, media player 124 can comprise a networked device and receive pre-rendered images in the form of an email attachment and the like. Alternatively, media player 124 can comprise a storage device that stores pre-rendered images and/or be connectable to such a storage device. In yet further implementations, media player 124 can be configured to one or more of: monitor status of control devices 110 and/or projectors 111; be aware of system status (e.g. a status of system 100); and turn on/off projectors 111, and the like. Generator 101 can control media player 124 and/or one or more of monitor status of control devices 110 and/or projectors 111; be aware of system status (e.g. a status of system 100); and turn on/off projectors 111, and the like.

In FIG. 1, solid lines connecting components depict links that include flow of image and/or video data there between, while the stippled line connecting components depict links that include flow of non-image and/or non-video data there between. However, non-image and/or non-video data can also flow on video and/or image links and vice-versa.

Furthermore, system 100 further comprises optional switches 128, 129, each labelled "OR". In particular, optional switch 128 comprises a switch for selecting data flow between generator 101 and one of real-time image generator 121 and pre-rendered image generator 123. Similarly, optional switch 129 comprises a switch for selecting image and/or video data flow between control devices 110 and one of real-time image generator 121 and pre-rendered image generator 123. In general, each optional switch 128, 129 is controlled so that data and images/video originate at one of real-time image generator 121 and pre-rendered image generator 123. In other words, one of real-time image generator 121 and pre-rendered image generator 123 can be optional.

Furthermore, optional switches 128, 129 are depicted merely to illustrate that images for projection by projectors 111 can be from one or more sources and hence switches 128, 129 are entirely optional and indeed need not be present in system 100. For example, optional switches 128, 129 merely illustrate that system 100 can comprise one or more of a plurality of image sources, including, but not limited to real-time image generator and 121, pre-rendered image generator 123 (and/or a storage device), and the like. Indeed, from the perspective of generator 101 and/or control devices 110 and/or projectors 111, the source of images for projection by projectors 111 can be irrelevant, though such images are to be in a specific format, as described in further detail below. However, in some implementations, switch 128 can comprise a "data connection" while switch 129 can comprise a "video connection" (including, but not limited to, a DVI (Digital Visual Interface) connection, a HDMI (High-Definition Multimedia Interface) connection, a network stream, and the like), which could, in turn distribute, video data to control devices 110 via network 125. Alternatively, switch 129 can comprise a plurality of video connections (e.g., a 1 in, 3 out DVI distribution amplifier). However, for scalability, video connections described herein can comprise network streamed video. Furthermore, data and video connections described herein can be combined, for example as such communication of video can be in the form of network data, including, but not limited to network packets. In this sense, optional switch 128 can comprise a "data connection" 128 which can also be used to "connect" image generator 123, and the like, to media player 124, as image generator 123 and media player 124 can be remotely located.

Furthermore, while generator 101, real-time image generator 121, pre-rendered image generator 123, media player 124 and switches 128, 129 are depicted as separate components, real-time image generator 121 and pre-rendered image generator 123 media player 124 and switches 128, 129 can be implemented as one or more components such that computing resources there between are shared. Hence, data flow between generator 101 and real-time image generator 121, pre-rendered image generator 123 can occur using network 125 and/or between co-located components. For example, system 100 can comprise a computing device comprising lookup table generator 101, memory 102, communication interface 104 and one or more of image generator 121, 123, such a computing device in communication with each of one or more control devices 110.

As depicted, system 100 further comprises an optical vision system 130 configured to determine a location, an orientation and lens characteristics associated with a given projector 111, for example relative to physical object 106 (and/or a 3D environment comprising physical object 106 and/or an origin associated with such a 3D environment). For example, optical vision system 130 can comprise a system similar to that described in Applicant's co-owned U.S. patent application Ser. No. 14/820,693, incorporated herein by reference. In general optical vision system 130 can comprise cameras and one or more projectors 111 (and/or other projectors) which together can be used to determine a location, an orientation and lens characteristics associated with a given projector 111, for example relative to physical object 106 (and/or a 3D environment comprising physical object 106 and/or an origin associated with such a 3D environment) and, in particular, a virtual location, a virtual orientation and virtual lens characteristics of a virtual camera relative to a virtual three-dimensional environment that corresponds to a 3D environment, for example within which physical object 106 is located, the virtual location, the virtual orientation and the virtual lens characteristics of the virtual camera respectively matching the location, the orientation and the lens characteristics of a given projector 111. However, for descriptive purposes, in the present application, reference will be made to a location, an orientation and lens characteristics associated with a given projector 111.

Generator 101 can comprise a computing device, including but not limited to a graphics processing unit (GPU), a graphics processing device, a graphics processing engine, a video processing device, a personal computer (PC), a server, and the like. As depicted, generator 101 generally comprises memory 102 and a communication interface 104 (interchangeably referred to hereafter as interface 104) and optionally any suitable combination of input devices and display devices.

Generator 101 can further comprise a processor and/or a plurality of processors, including but not limited to one or more central processors (CPUs) and/or one or more processing units and/or one or more graphic processing units (GPUs); either way, generator 101 comprises a hardware element and/or a hardware processor. Indeed, in some implementations, generator 101 can comprise an ASIC (application-specific integrated circuit) and/or an FPGA (field-programmable gate array) specifically configured to implement the functionality of generator 101. Hence, generator 101 is not necessarily a generic computing device, but a device specifically configured to implement specific functionality including generating lookup tables as described in further detail below. For example, generator 101 can specifically comprise an engine configured to generate lookup tables.

Memory 102 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of generator 101 as described herein are typically maintained, persistently, in memory 102 and used by generator 101 which makes appropriate utilization of volatile storage during the execution of such programming instructions. Those skilled in the art recognize that memory 102 is an example of computer readable media that can store programming instructions executable on generator 101. Furthermore, memory 102 is also an example of a memory unit and/or memory module and/or a non-volatile memory.

In particular, memory 102 can store an application (not depicted) that, when implemented by generator 101, enables generator 101 to: receive projector data defining a location, an orientation and lens characteristics associated with a given projector 111, relative to physical object 106; generate a lookup table from 3D model 105, mapping 107 and the projector data, the lookup table comprising a respective mapping of projector pixels to the unwrapped 2D surfaces of 3D model 105, respective to the given projector; and, transmit, using the communication interface 104, the lookup table to a given control device in communication with the given projector. Alternatively, functionality of generator 101 can be hard-wired at circuitry of generator 101.

Memory 102 further stores 3D model 105 of physical object 106. In other words, dimensions, surfaces, shapes, and the like, of physical object 106 are defined 3D model 105. For example, as depicted physical object 106 comprises a cube with six faces (labelled A, B, C, D, E, F within the specification, though only faces A, C and D are visible in FIG. 1), and 3D model 105 can comprise a 3D model defining a cube. However, other combinations of physical objects and 3D models thereof are within the scope of present implementations, including physical models with complex shapes, curves, non-rectilinear interfaces between surfaces etc. For example, 3D model 105 can comprise data derived from a 3D printing file, with physical object 106 produced from the same 3D printing file; however, 3D models 105 and/or physical objects can be produced in other ways as will occur to persons of skill in the art. For example, 3D model 105 can comprise one or more of a 3D mesh and a plurality of triangles representing the 3D mesh; in the depicted example where physical object 106 comprises a cube, the 3D mesh and/or the plurality of triangles can define a model of a cube.

Memory 102 further stores mapping 107, which will be described in further detail below, however, in general, mapping 107 can comprise a mapping of 3D model 105 onto unwrapped 2D surfaces of the 3D model.

Interface 104 comprises any suitable wired or wireless communication interface configured to communicate with control devices 110, network 125, time image generator 121, and/or pre-rendered image generator 123.

Each projector 111 comprises a projector configured to project images and/or video, and can include, but is not limited to a digital projector, a cinema projector, an LCOS (Liquid Crystal on Silicon) based projector, a DMD (digital micromirror device) based projector and the like. Furthermore, while three projectors 111 are depicted, system 100 can comprise as few as one projector 111, and more than three projectors 111. For example, plurality of projectors 111 can be configured to project respective images and/or video onto physical object 106 as portions of a larger tiled image. Hence, projectors 111 are generally arranged to project onto physical object 106 from different positions and/or orientations.

Each control device 110 can comprise a component of a respective projector 111 and hence a pair of a control device 110 and a projector 111 can share computing resources; and/or each control device 110 can comprise a component separate from, but in communication with, a respective projector 111. Either way each control device 110 is configured to receive images and/or video (e.g. a common 2D texture map, as described below) from one of real-time image generator 121 and pre-rendered image generator 123, at any given time, and a respective lookup table from generator 101, and control a respective projector 111 accordingly. While not depicted, each control device 110 can hence comprise a memory and a communication interface, respectively similar to memory 102 and interface 104.

Each of real-time image generator 121 and pre-rendered image generator 123 comprise graphics engines and/or video engines configure to one of generate (and/or render) images in real-time (e.g. real-time image generator 121) and transmit to control devices 110, or transmit pre-rendered images to media player 124, which in turns "plays" the pre-rendered images and transmits to control devices 110. Media player 124 generally processes and/or "plays" pre-rendered images and/or video by producing an image feed and/or video feed suitable for processing by control device 110 and projection by a projector 111. However, pre-rendered image generator 123 need not be specifically configured to transmit pre-rendered images to media player 124 via network 125; rather, pre-rendered image generator 123 can generate the pre-rendered images, the pre-rendered images can be stored on a transportable storage device at pre-rendered image generator 123, and the transportable storage device can then be physically transported to, and connected with media player 124.

Furthermore, each of real-time image generator 121 and pre-rendered image generator 123 can be configured to store and/or generate one or more of 3D model 105 and mapping 107 and/or transmit to generator 101 (and/or store to a transportable storage device transported to generator 101) such that generator 101 is further configured to receive 3D model 105 and mapping 107 from an image generator 121, 123 (and/or media player 124). However, when generator 101 and one or more of real-time image generator 121 and pre-rendered image generator 123 are integrated into one component, model 105 and mapping 107 can be accessible from a shared memory.

Furthermore, one or more of real-time image generator 121 and pre-rendered image generator 123 can generate and/or store a 2D texture data 160 2D comprising images associated with each of the unwrapped 2D surfaces of 3D model 105, described in further detail below. Each of one or more of real-time image generator 121 and pre-rendered image generator 123 can transmit the 2D texture data 160 to each control device 110, for example as video data (including, but not limited to, streaming video data); indeed, it is assumed in FIG. 1 that each control device 110 has received and/or is receiving 2D texture data 160, for example in a provisioning process and/or in a video streaming process, via network 125. In specific non-limiting implementations, 2D texture data 160 comprises a baked UV texture map and/or video. However, formats of 2D texture data 160 other than a baked UV texture map are within the scope of present implementations. Furthermore, in some implementations, 2D texture data 160 (e.g. video data), 3D model 105, and mapping 107 can be packaged together into, and unpacked by components of system 100 that receive the package.

In general, the image feed and/or videos feed comprises images and/video to be projected onto physical object 106, with control device 110 selecting a portion of the images and/or video to be projected by a given projector 111 using a respective lookup table received from generator 101, as described in detail below with respect to FIG. 11.

Attention is now directed to FIG. 2 which depicts a flowchart of a method 200 for generating a lookup table, according to non-limiting implementations. In order to assist in the explanation of method 200, it will be assumed that method 200 is performed using system 100, and specifically by generator 101. Indeed, method 200 is one way in which system 100 and/or generator 101 can be configured. Furthermore, the following discussion of method 200 will lead to a further understanding of generator 101, and system 100 and its various components. However, it is to be understood that system 100 and/or generator 101 and/or method 200 can be varied, and need not work exactly as discussed herein in conjunction with each other, and that such variations are within the scope of present implementations.

Regardless, it is to be emphasized, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of system 100 and/or generator 101 as well.

At block 201, generator 101 receives projector data defining a location, an orientation and lens characteristics associated with a given projector 111, relative to physical object 106. At block 203, generator 101 generates a lookup table from 3D model 105, mapping 107 and the projector data, the lookup table comprising a respective mapping of projector pixels to the unwrapped 2D surfaces of the 3D model, respective to given projector 111. At block 205, generator 101 transmits, using communication interface 104, the lookup table to a given control device 110 in communication with given projector 111.

Method 200 will now be described with reference to FIGS. 3 to 15, with each of FIGS. 3, 8, 9, 10 and 13 being substantially similar to FIG. 1, with like elements having like numbers. In each of FIGS. 3, 8, 9, 10 and 13, it is assumed that generator 101 has been previously provisioned with 3D model 105 and mapping 107. For example, generator 101 can be further configured to receive 3D model 105 and mapping 107 from an image generator, including, one or more of real-time image generator 121 and pre-rendered image generator 123, for example in a provisioning process.

Figure 3:
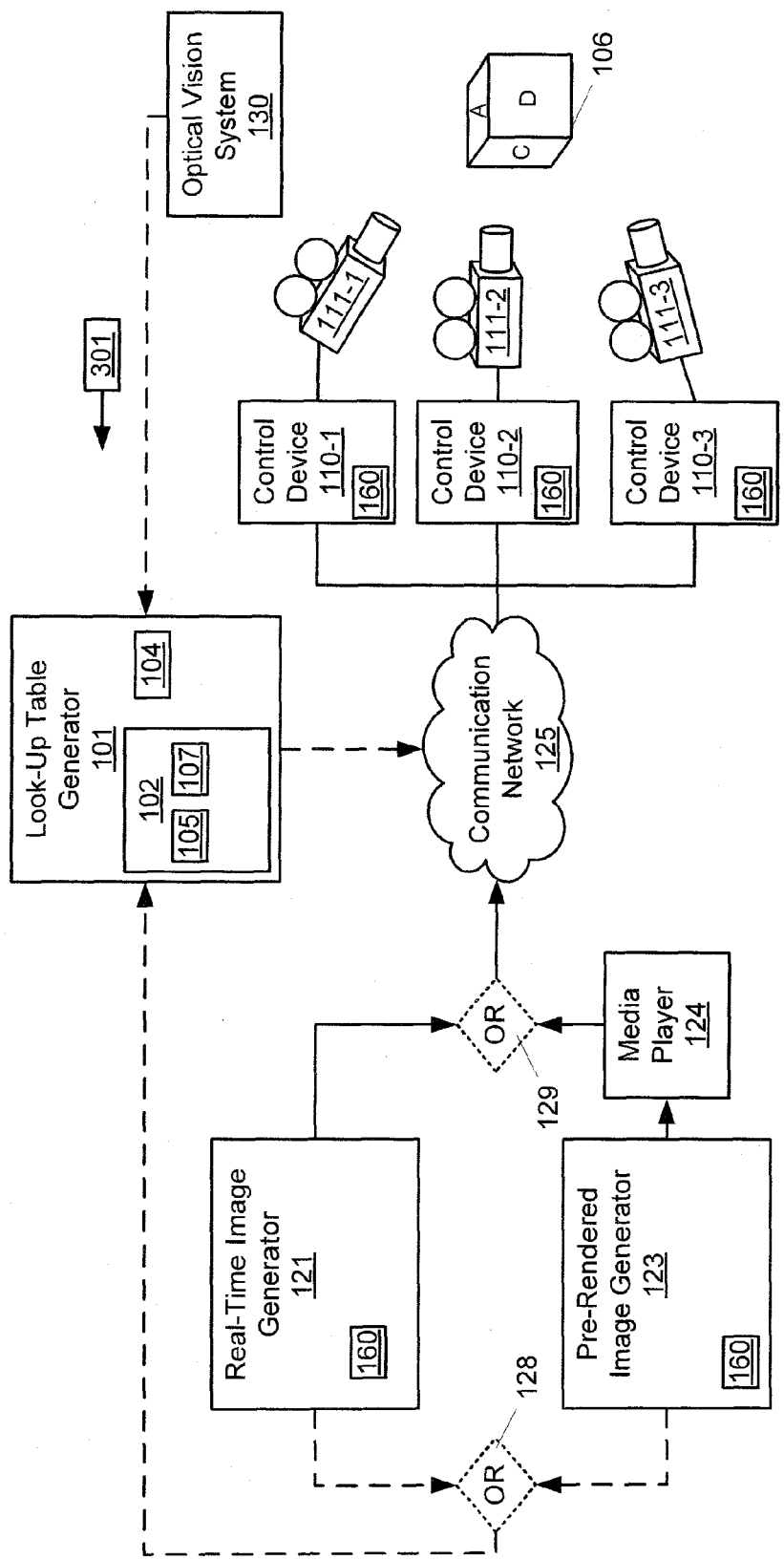
FIG. 3 depicts the system of FIG. 1 in which respective projector data is generated by an optical vision system, according to non-limiting implementations.

Attention is next directed to FIG. 3, where generator 101 is depicted as receiving (e.g. at block 201) projector data 301 from optical vision system 130, which automatically determines projector data 301 and transmits the projector data 301 to generator 101. In implementations where system 100 comprises one projector 111, one set of projector data 301 is determined by optical vision system 130 and received at generator 101; however, in implementations where system 100 comprises more than one projector 111, as depicted, a set of projector data 301 is determined for each projector by optical vision system 130 and received at generator 101. Hence, as system 100 is depicted as including three projectors 111, in depicted implementations, generator 101 will receive three sets of projector data 301. As depicted, it is assumed that projector data 301 comprises respective projector data for each of projectors 111.

Alternatively, projector data 301 can be received at generator 101 using an input device (not depicted); for example, projector data 301 can be determined manually and/or using a portable vision system, and the like, not in communication with generator 101, and the projector data 301 can thereafter be input at generator 101 using an input device.

Regardless, projector data 301 generally comprises a location, an orientation and lens characteristics associated with one or more given projectors 111, as described above. Hence, projector data 301 can comprise pose data for the given projector. In some implementations projector data 301 can include, but is not limited to, a three-dimensional position associated with one or more given projectors 111, for example expressed in "X, Y, Z" coordinates (and the like) with respect to an origin, a pitch value, a yaw value, a roll value, an offset value, a throw value (which can also be determined from three-dimensional position associated with one or more given projectors 111 and, for example, as aspect ratio of an image, as understood by persons of skill in the art) and the like. However, projector data 301 (and/or the pose data) can be defined using any suitable combination of parameters, including, but not limited to, horizontalStart, horizontalEnd, verticalStart, verticalEnd, where horizontalStart, horizontalEnd, verticalStart, verticalEnd are each angles. For example, each of the following sets of parameters can form a complete set of parameters for defining pose data of a projector: x,y,z,yaw,pitch,roll,hStart,hEnd,vStart, vEnd}; {x,y,z,yaw,pitch,roll,hFOV,vFOV,hOffset, vOffset}; and, {x,y,z,yaw,pitch,roll,throw ratio, aspect ratio, hOffset, vOffset} However, other sets of parameters are within the scope of present implementations.

Figure 4:
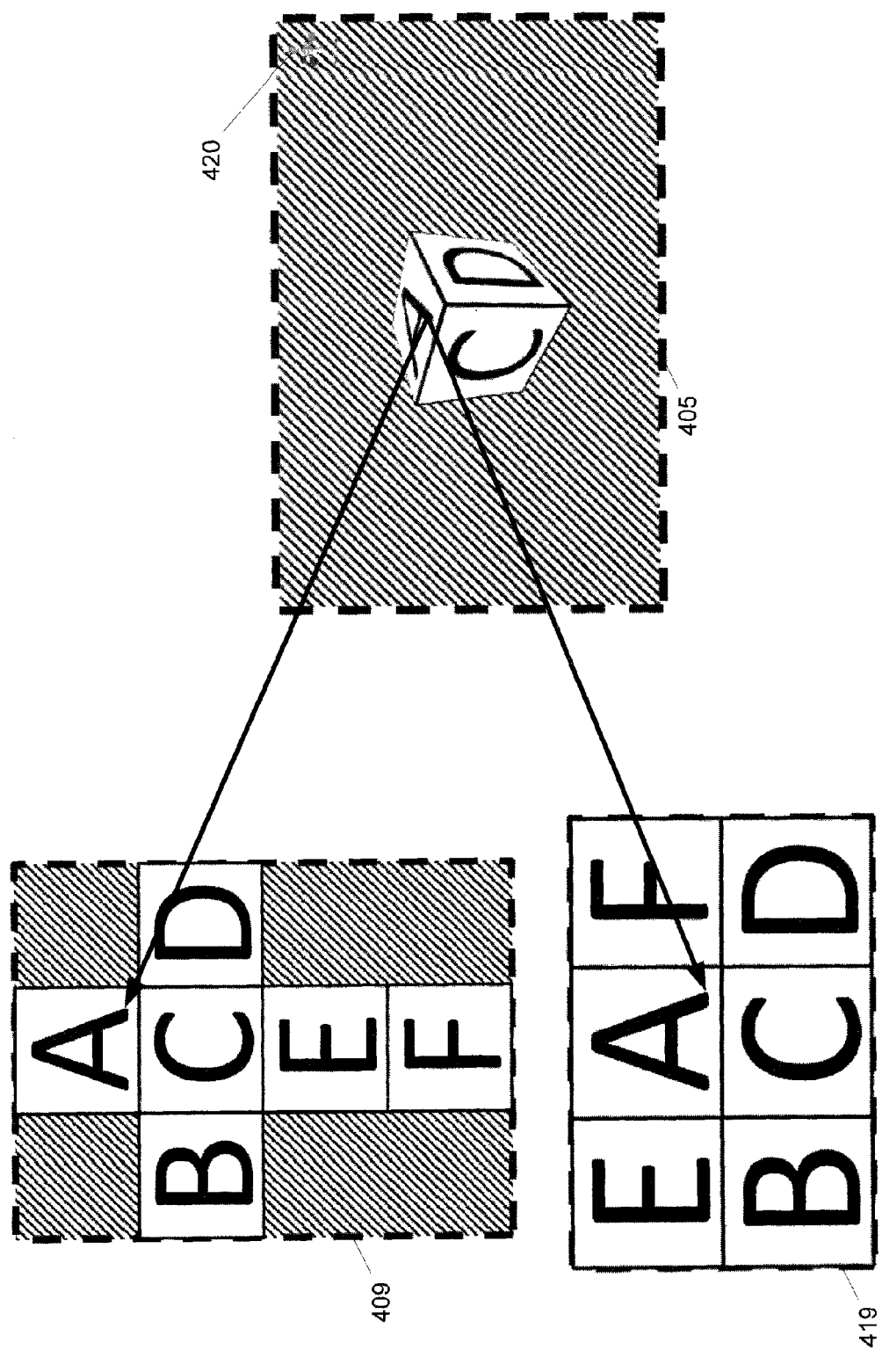
FIG. 4 depicts a mapping of two-dimensional ("2D") unwrapped surfaces of a three-dimensional ("3D") model, according to non-limiting implementations.

Attention is next directed to FIG. 4 which depicts a non-limiting visual 3D representation 405 of 3D model 105, assuming that 3D model 105 comprises a 3D model of a cube corresponding to physical object 106. In particular, representation 405 depicts faces of a cube with letters of each visible face (labelled "A", "B", C", etc.) rendered thereupon in perspective to provide a visual orientation of the cube, though the letters are present merely to distinguish between different faces and/or surfaces of the cube and are not present in 3D model 105. Indeed, 3D model 105 defines the surfaces of physical object 106 without defining images and/or textures to be projected and/or rendered thereupon. The shaded areas of representation 405 are not necessarily part of 3D model 105, but represent areas and/or volumes where the cube is not located.

Put another way, 3D representation 405, and hence 3D model 105, comprises 3D coordinates of an object which can be associated with a 2D texture map, as described in more detail below.

FIG. 4 also depicts two different implementations of unwrapped 2D surfaces of 3D model 105, in particular, unwrapped 2D surfaces 409 and unwrapped 2D surfaces 419. Each of unwrapped 2D surfaces 409, 419 comprise surfaces of 3D model 105 that are decoupled from 3D depth information, and hence represented as 2D surfaces, however a map between 3D model 105 and one or more of unwrapped 2D surfaces 409, 419 can indicate points and/or pixels and/or areas of 3D model 105 that are associated with points and/or pixels and/or areas of one or more of unwrapped 2D surfaces 409, 419, as indicated by the two arrows pointing from a bottom-right portion of the "A" surface of representation 405 to the corresponding bottom-right portion of the respective "A" surface of each of unwrapped 2D surfaces 409, 419. In other words, the arrows comprise a visual representation of mapping 107 though mapping 107 can comprise one or more tables that associates 3D coordinates of 3D model 105 with corresponding 2D coordinates of one or more of unwrapped 2D surfaces 409, 419. Representation is also depicted with a 3D origin 420 in an upper-right corner, though a position of virtual origin 420 is arbitrary; nonetheless coordinates of 3D model 105 can be determined relative to virtual origin 420.

As with representation 405, the letters in unwrapped 2D surfaces 409, 419 are depicted merely to distinguish between the different surfaces. In other words, points and/or pixels and/or areas of unwrapped 2D surfaces 409, 419 correspond to points and/or pixels and/or areas of representation 405 and/or 3D model 105, but expressed in 2D coordinates. In other words, each of unwrapped 2D surfaces 409, 419 can represent points and/or pixels and/or areas stored in a 2D format.

Furthermore, points and/or pixels and/or areas of unwrapped 2D surfaces 409, 419 can also correspond to points and/or pixels and/or areas of unwrapped 2D surfaces 409, 419 of 2D texture data 160, as described below.

Furthermore, while an origin for each of unwrapped 2D surfaces 409, 419 is not depicted, points and/or pixels and/or areas of representation 405 can nonetheless be optionally determined relative to an origin for each of unwrapped 2D surfaces 409, 419. Alternatively, each surface in each of unwrapped 2D surfaces 409, 419 can be provided with a respective origin and respective coordinates of each surface determined relative to the respective origin.

Unwrapped 2D surfaces 409, 419 also illustrate two different ways of storing 2D surfaces, with unwrapped 2D surfaces 409 stored to indicate relative relationships between corresponding surfaces of 3D model 105, and unwrapped 2D surfaces 419 stored to minimize an amount of memory used to store unwrapped 2D surfaces 419 relative, for example, to unwrapped 2D surfaces 409. In other words, as unwrapped 2D surfaces 409 are stored as an unwrapped version of a cube, with edges of adjacent surfaces being stored adjacent to one another, however this leads to points and/or pixels and/or areas that do not represent a surface of 3D model 105, and hence, to points and/or pixels and/or areas (i.e. 2D coordinates) that do not correspond to a surface, which are depicted as shaded areas in FIG. 4. However, unwrapped 2D surfaces 419 are stored without regard to relationships between the individual surfaces, but rather are stored and/or packed to minimize and/or eliminate coordinates which do not represent corresponding surfaces of 3D model 105; for example, as each surface is square, each 2D representation of the surfaces can be stored, in any order, in a grid format thereby minimizing and/or eliminating coordinates which do not represent corresponding surfaces of 3D model 105.

For example, in some implementations each of unwrapped 2D surfaces 409, 419 can comprise and/or reflect raster images; in unwrapped 2D surfaces 409, 50% of the raster image comprises points and/or pixels and/or areas that define surfaces of 3D model 105, while in unwrapped 2D surfaces 419, 100% of the raster image comprises points and/or pixels and/or areas that define surfaces of 3D model 105.

For more complex shapes, a complete elimination of coordinates which do not represent corresponding surfaces of 3D model 105 may be difficult but nonetheless surfaces can be packed as close together as possible within the 2D coordinates. Regardless, each point and/or pixel and/or area that corresponds to a point and/or pixel and/or area on 3D model is mapped thereto in mapping 107.

Figure 5:
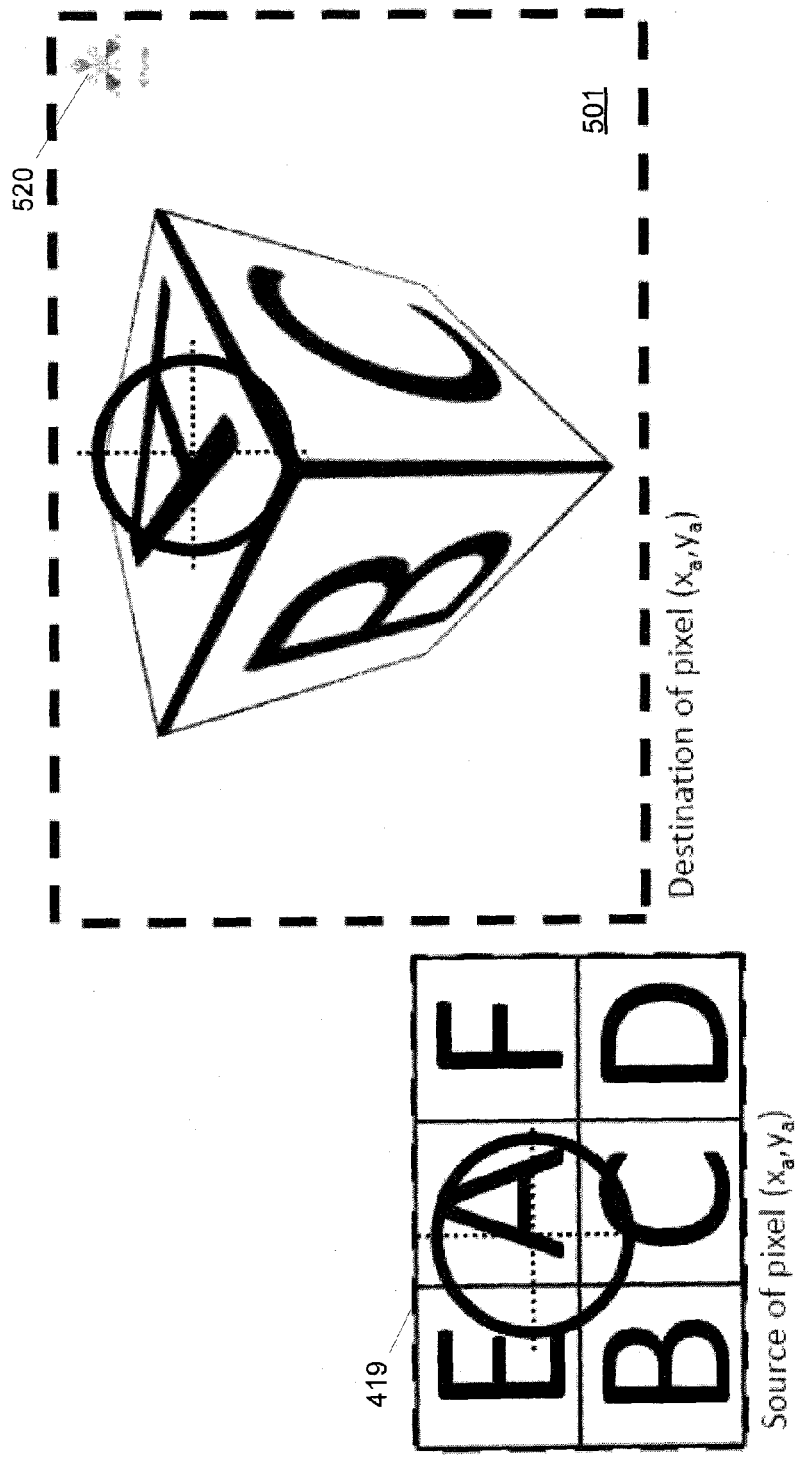
FIG. 5 depicts an example of generating a lookup table from the mapping of FIG. 4 and a view generated from the projector data, according to non-limiting implementations.
Figure 6:
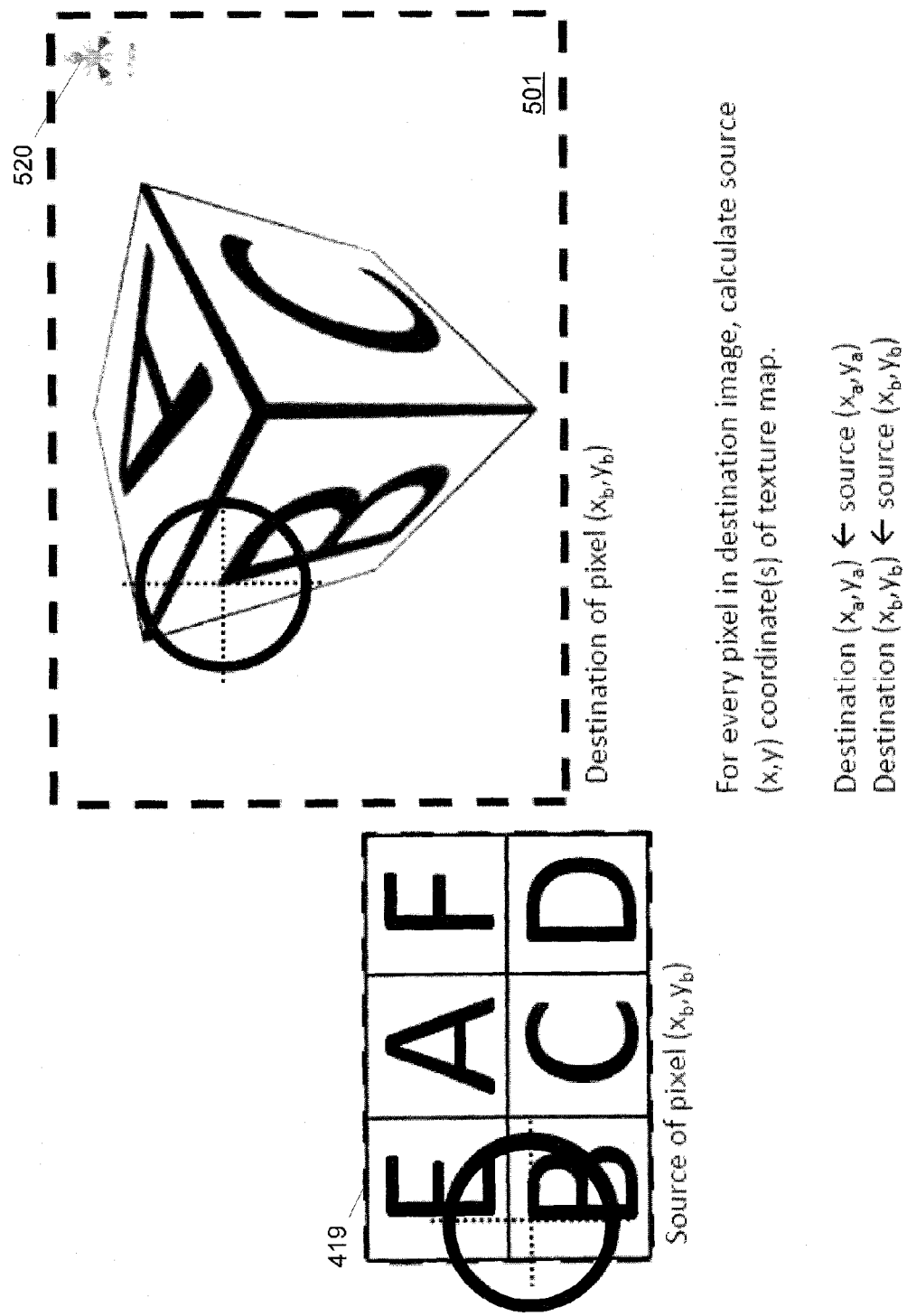
FIG. 6 depicts the example of FIG. 5 continued, according to non-limiting implementations.
Figure 7:
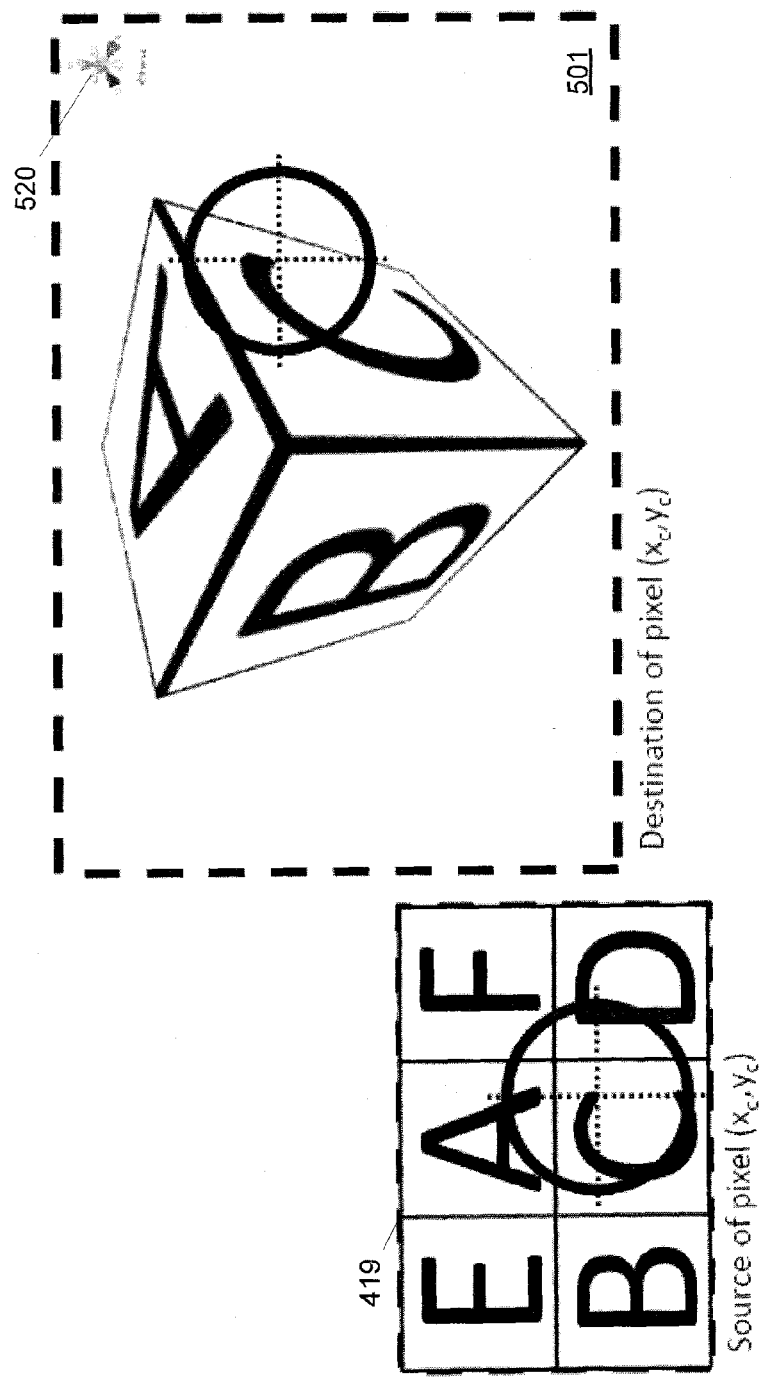
FIG. 7 depicts the example of FIG. 5 and FIG. 6 continued, according to non-limiting implementations.

Attention is next directed to FIG. 5, FIG. 6 and FIG. 7 which depict an implementation of block 203 of method 200 in which a lookup table is generated. In implementations described with reference to FIG. 5, FIG. 6 and FIG. 7, unwrapped 2D surfaces 419 will be used, however, unwrapped 2D surfaces 409 could be used in place of unwrapped 2D surfaces 419. Furthermore, while FIG. 5, FIG. 6 and FIG. 7 describe generating a lookup table respective to one of projectors 111, a similar process can be used to generate a lookup table for each of projectors 111.

Attention is first directed to FIG. 5 which depicts a first point of a lookup table being generated by mapping a pixel (and/or point and/or area) on the "A" surface of unwrapped 2D surfaces 419 to a corresponding pixel (and/or point and/or area) in a view 501 of projector 111-1 as determined from projector data 301. For example, from projector data 301, a view of projector 111-1 can be determined such that pose data for projector 111-1 can be used to determine surfaces of physical object 106 that are available for projection thereupon by projector 111-1. In other words, block 203 can more specifically comprise: generating a lookup table by: determining, from 3D model 105 and mapping 107, for the projector pixels in a view 501 of given projector 111-1, source coordinates of a texture map, view 501 determined from projector data 301.

Hence, for example, view 501 can be generated from projector data 301 which can define a spatial relationship between projector 111-1 and physical object 106 such that view 501 represents what is "seen" by projector 111-1 (or more specifically a virtual camera having similar location, orientation and lens characteristics of projector 111-1, including a virtual origin 520 which can be the same or different from virtual origin 420). Such a determination can be made using techniques that include, but are not limited to, ray-tracing, multi-sampling, anti-aliasing and the like. Hence, as clearly seen in view 501, a particular view of the cube is provided, with particular surfaces of the cube shown in a particular orientation. View 501 is, however, a virtual view, for example of 3D model 105 and not an actual view of projector 111-1; in other words, there is no need to mount a camera at a position of projector 111-1 to determine view 501.

Once view 501 is determined, source pixels (and/or points and/or areas and the like) of unwrapped 2D surfaces 419 can be associated with destination pixels (and/or points and/or areas and the like) of view 501. For example, a [source pixel (xa,ya)] on the "A" surface of unwrapped 2D surfaces 419 is associated with a corresponding [destination pixel (xa, ya)] in view 501 of projector 111-1 using mapping 107. For example, as mapping 107 defines relationships between unwrapped 2D surfaces 419 and 3D model 105, the relationship between pixels of view 501 of 3D model 105 and unwrapped 2D surfaces 419 can be determined and placed in a lookup table. Furthermore, while [source pixel (xa,ya)] and [destination pixel (xa, ya)] each refer to a pixel (xa, ya), each of [source pixel (xa,ya)] and [destination pixel (xa, ya)] are mapped to each other, are not necessarily the same coordinate values; for example, source pixels and destination pixels can be mapped to different areas. Hence the term (xa, ya) in each of [source pixel (xa,ya)] and [destination pixel (xa, ya)] is merely meant to refer to each of the pixels being mapped to each other.

Attention is next directed to FIG. 6 and FIG. 7 which depict two more relationships of a lookup table for projector 111-1 being generated. The same process described above with respect to FIG. 5 occurs in FIG. 6 to associate a second [source pixel (xb,yb)] on the "B" surface of unwrapped 2D surfaces 419 with a corresponding [destination pixel (xb, yb)] in view 501 of projector 111-1 using mapping 107. Similarly, in FIG. 7, second [source pixel (xc,yc)] on the "C" surface of unwrapped 2D surfaces 419 with a corresponding [destination pixel (xc, yc)] in view 501 of projector 111-1 using mapping 107.

Figure 8:
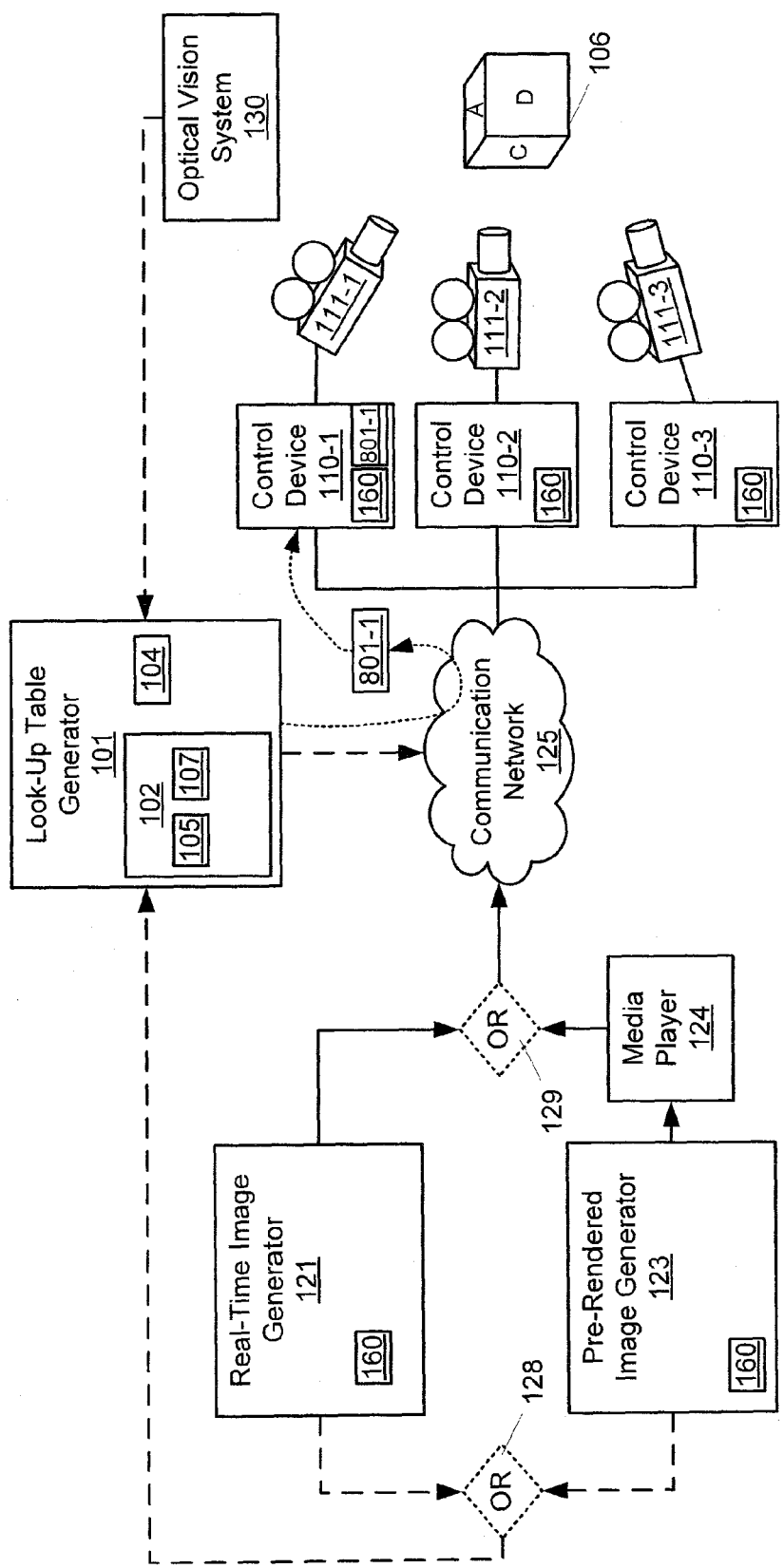
FIG. 8 depicts the system of FIG. 1 provisioning a first control device with a respective lookup table, according to non-limiting implementations.
Figure 9:
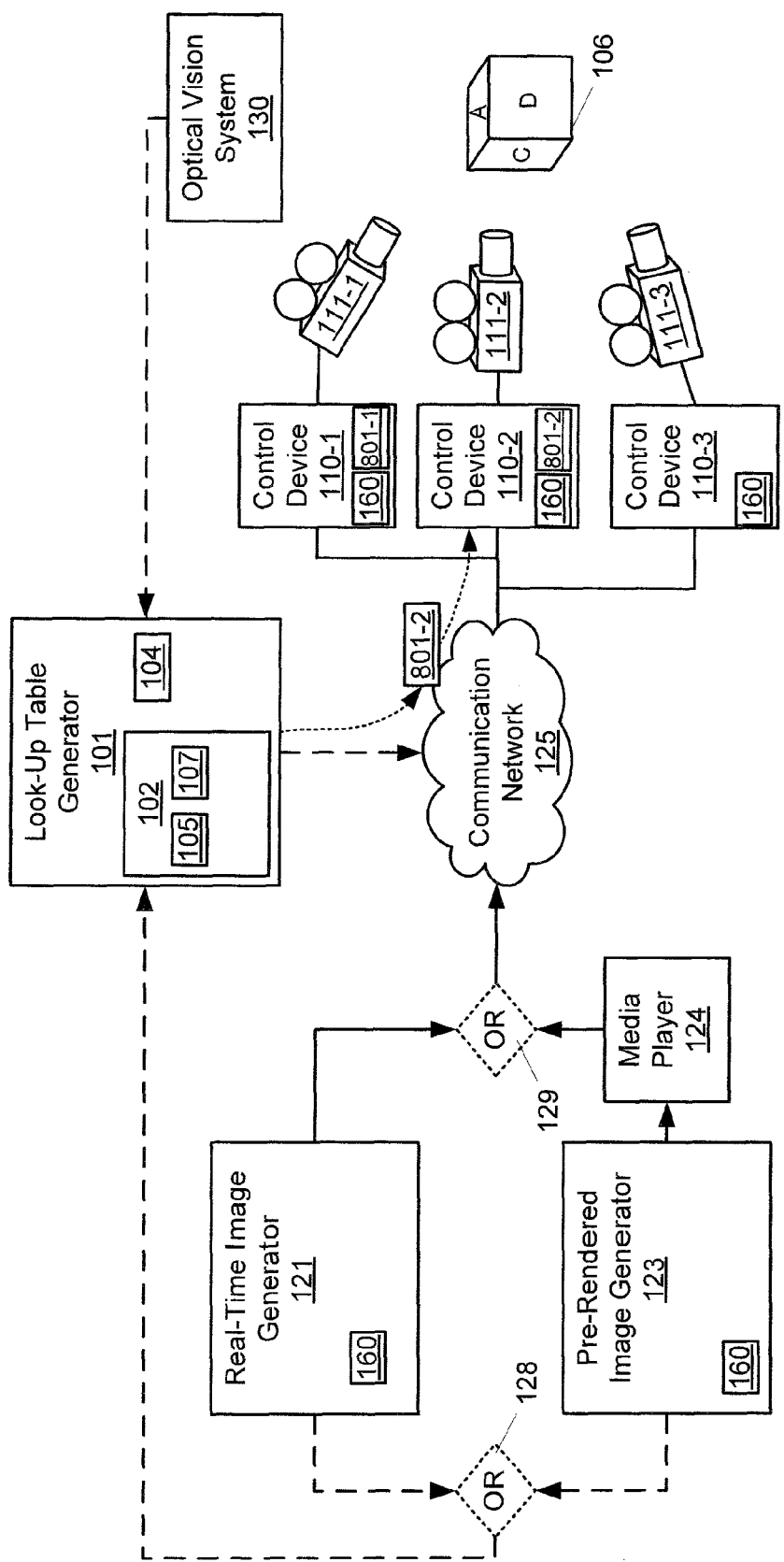
FIG. 9 depicts the system of FIG. 1 provisioning a second control device with a respective lookup table, according to non-limiting implementations.

In any event, the process described with reference to FIG. 5, FIG. 6 and FIG. 7 occurs for pixels (and/or points and/or areas) of view 501 and the association between source pixels and destination pixels is generated, with reference to FIG. 8, as lookup table 801-1, which is transmitted (e.g. at block 205) to control device 110-1 for storage. Indeed, respective lookup tables 801-2, 801-3 can be generated in a similar manner for each of projectors 111-2, 111-3, and transmitted (e.g. at block 205) to respective control devices 110-2, 110-3, as respectively depicted in FIG. 9 and FIG. 10. Hence, as there are three projectors 111 in system 100, three lookup tables 801-1, 801-2, 801-3 are generated by generator 101. Lookup tables 801-1, 801-2, 801-3 will be interchangeably referred to hereafter, collectively, as tables 801 and, generically as a table 801. While three lookup tables 801 are generated, when system 100 comprises "N" projectors 111, "N" lookup tables 801 are generated, in a one-to-one relationship, where "N" comprises an integer number.

Figure 10:
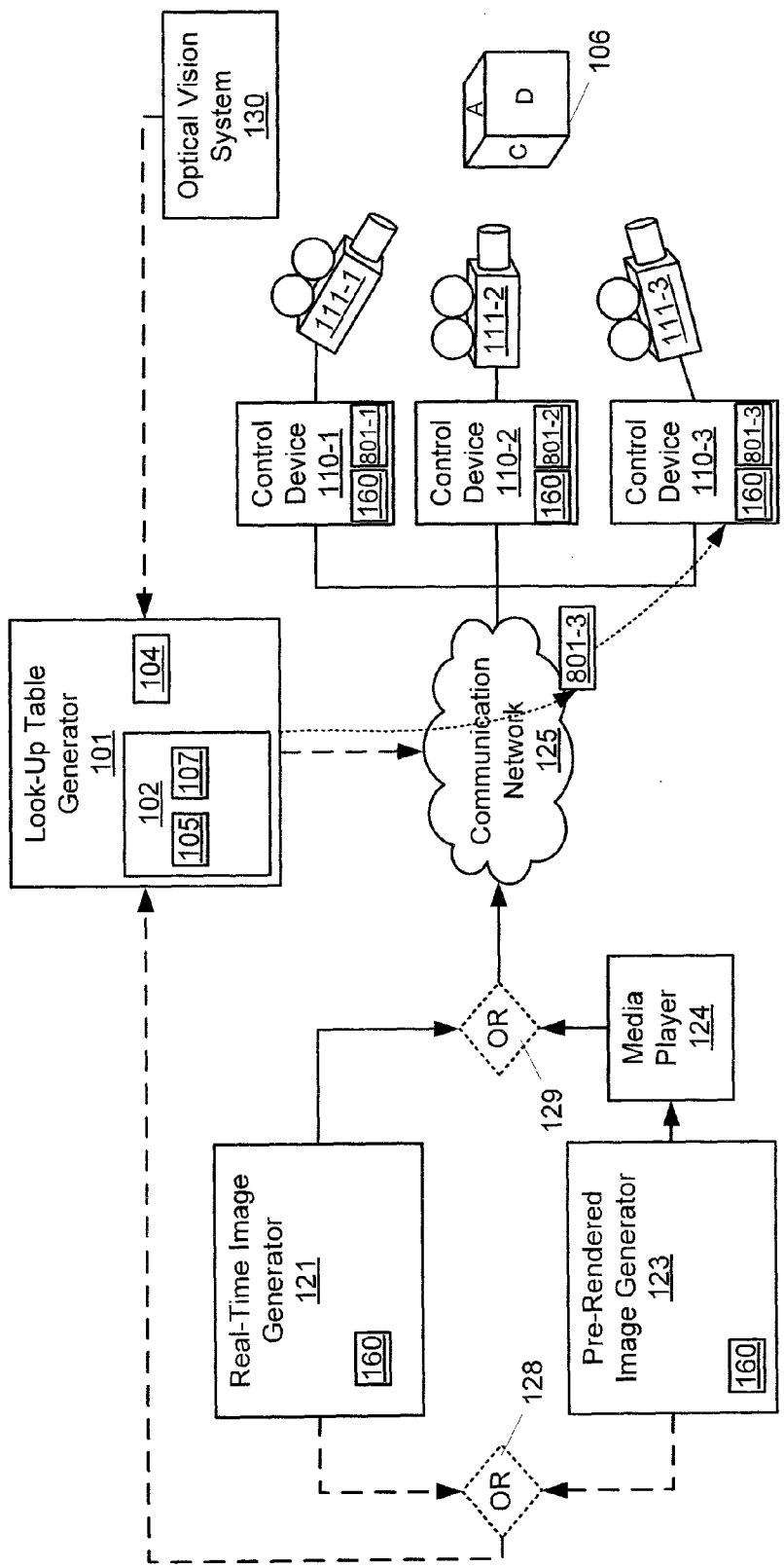
FIG. 10 depicts the system of FIG. 1 provisioning a second control device with a respective lookup table, according to non-limiting implementations.

In any event, as depicted in FIG. 10, each control device 110 stores a different lookup table 801 respective to an associated projector 111. Indeed, assuming that system 100 comprises a plurality of control devices 110 (including the given control device 110 referred to in method 200), in a one-to-one relationship with a plurality of projectors 111 (including given projector 111 referred to in method 200), each of plurality of control devices 110 storing 2D texture data 160 (which is common to all of plurality of control devices 110), lookup table generator 101 can be further configured to, for each of the plurality of control devices 110: receive respective projector data 301 defining a respective location, a respective orientation and respective lens characteristics associated with an associated given projector 111, relative to physical object 106; generate a respective lookup table 801 for a respective control device 110 from 3D model 105, mapping 107 and respective projector data 301, the respective lookup table 801 comprising a respective mapping of respective projector pixels to unwrapped 2D surfaces 419 of 3D model 105, for respective associated projector 111; and, transmit, using the communication interface 104, respective lookup table 801 to the respective control device 110.

While not depicted, in some implementations, lookup table generator 101 can be further configured to generate lookup table 801 taking into account one or more of blending and warping. For example, in implementations where blending occurs, there is an assumption that images from different projectors 111 will overlap when projected onto physical object 106. Blending of images from "N" projectors 111 generally uses 3D model 105, mapping 107 and projector data 301 for each of the "N" projectors 111 to determine the degree of overlap between views of the "N" projectors 111. In these implementations, in a lookup table 801 the respective mapping of respective projector pixels to unwrapped 2D surfaces 419 of 3D model 105 can include a blending value to indicate a relative brightness of a pixel, for example in a blend area. Alternatively, each control device 110 could be provisioned with a 2D raster format (and the like) of a "multiplier" blend image to be multiplied with a non-blended rasterized 3D view to be projected by an associated projector 111.

Warping can occur when 3D model 105 differs from physical object 106 by some distortion and/or to account for pincushion distortions and/or barrel distortions inherent to a lens of a projector 111. In some implementations, images and/or data from optical vision system 130 can be used to determine such differences and/or distortions by comparing images of physical object 106, and/or data representing physical object 106 to 3D model 105. For example, 3D model 105 can comprise a cube, but images from optical vision system 130 are used to identify physical object 106 as a rectangular cuboid (e.g. not a cube). In these implementations, a "corrected" 3D model can hence be generated and/or data can be generated that defines a warp of physical object 106 relative to 3D model 105. In these implementations, in a lookup table 801 the respective mapping of respective projector pixels to unwrapped 2D surfaces 419 of 3D model 105 can be generated to warp the respective mapping.

Attention is next directed to FIG. 11 which depicts a non-limiting example of 2D texture data 160 alongside unwrapped 2D surfaces 419. In general, 2D texture data 160 comprises images that are to be projected onto physical object 106. In the example provided herein, physical object 106, and hence 3D model 105, comprises a cube, and unwrapped 2D surfaces 419 comprises coordinates defining the six surfaces of the cube, decoupled from the 3D coordinates, as described above. Hence, as depicted in FIG. 11, 2D texture data 160 comprises six images, each of which are to be projected onto the cube in a given order. Indeed, as also depicted in FIG. 11, the order that the images are stored in 2D texture data 160 can correspond to the order of surfaces in unwrapped 2D surfaces 419. For example, the crescent moon in 2D texture data 160 is to be projected on surface "E", the circle is to be projected on surface "A", etc. Indeed, as depicted a letter of a surface onto which a respective image is to be projected is indicated in 2D texture data 160, though the letters depicted in FIG. 11 are used merely to provide a reference to each surface and are not actually present in 2D texture data 160.

However, while 2D texture data 160 as depicted in FIG. 11 merely shows images to be projected, 2D texture data 160 can further include surface characteristic data to be projected onto physical object 106; such surface characteristic data can include, but is not limited to, surface texture data, surface material data (as different materials can affect surface texture in different ways), surface colour data, and the like, which define surface characteristics of the different images to be projected onto physical object 106. However, in some implementations, in the simplest case, 2D texture data 160 can comprise only colour surface data (e.g. which define images to be projected); in other words, 2D texture data 160 can effectively be "baked", in that all computation of all kinds of maps is computed to result in a single colour per pixel element of the texture map (e.g. in RGB pixels). However, in other implementations, 2D texture data 160 can include information such as specularity, bump maps, normal maps, reflection maps, self-illumination maps, and the like.

In other words, each control device 110 stores the same 2D texture data 160 comprising images associated with each of unwrapped 2D surfaces 419 of 3D model 105. Furthermore, as described above, each control device 110 has received a respective lookup table 801 that can instruct each control device 110 which portions and/or pixels of and/or areas of 2D texture data 160 to select for projection onto physical object 106 by a respective projector 111, as determined from mapping 107 and projector data 301. As portions and/or pixels and/or areas of mapping 107 corresponds to respective portions and/or respective pixels and/or respective areas of 2D texture data 160, as well as 3D model 105, each respective lookup table 801 provides a mapping of 2D texture data 160 onto views of each respective projector 111.

Indeed, each control device 110 is configured to generate a respective image to be projected onto physical object 106 by a respective projector 111 by using a respective lookup table 801 to associate portions of 2D texture data 160 with projector pixels.

For example, attention is next directed to FIG. 12, which depicts 2D texture data 160 as stored at all control devices 110, including control device 110-1, and an image 1201-1 generated by control device 110-1 from lookup table 801-1 received from generator 101, image 1201-1 to be projected onto physical object 106 by projector 111-1. With lookup table 801-1 control device 110-1 can populate pixels of image 1201-1 (which can also be referred to a destination image), from 2D texture data 160 without using 3D model 105 or mapping 107. For example, image 1201-1 corresponds to view 501 of given projector 111-1, however with pixels populated with data from 2D texture data 160 using lookup table 801-1. Hence, when image 1201-1 is projected by projector 111-1 onto physical object 106, the "A" surface will have the circle (e.g. image "A") from 2D texture data 160 projected thereupon with the perspective corrected for the position and/or orientation and/or lens characteristics associated with projector 111-1; similarly, when image 1201-1 is projected by projector 111-1 onto physical object 106, the "B" surface and the "C" surface will respectively have the hexagon (e.g. image "B") and the square (e.g. image "C") from 2D texture data 160 projected thereupon with the perspective corrected for the position and/or orientation and/or lens characteristics associated with projector 111-1. As indicated in FIG. 12, portions of image 1201-1 that do not correspond to surfaces of physical object 106 are non-utilized and/or contain non-utilized (e.g. black) pixels. Once image 1201-1 is generated, image 1201-1 is projected onto physical object 106 by projector 111-1.

A similar process occurs at each of control devices 110 and projectors 111, using respective lookup tables 801 and 2D texture data 160, which is common to all control devices 110.

Figure 13:
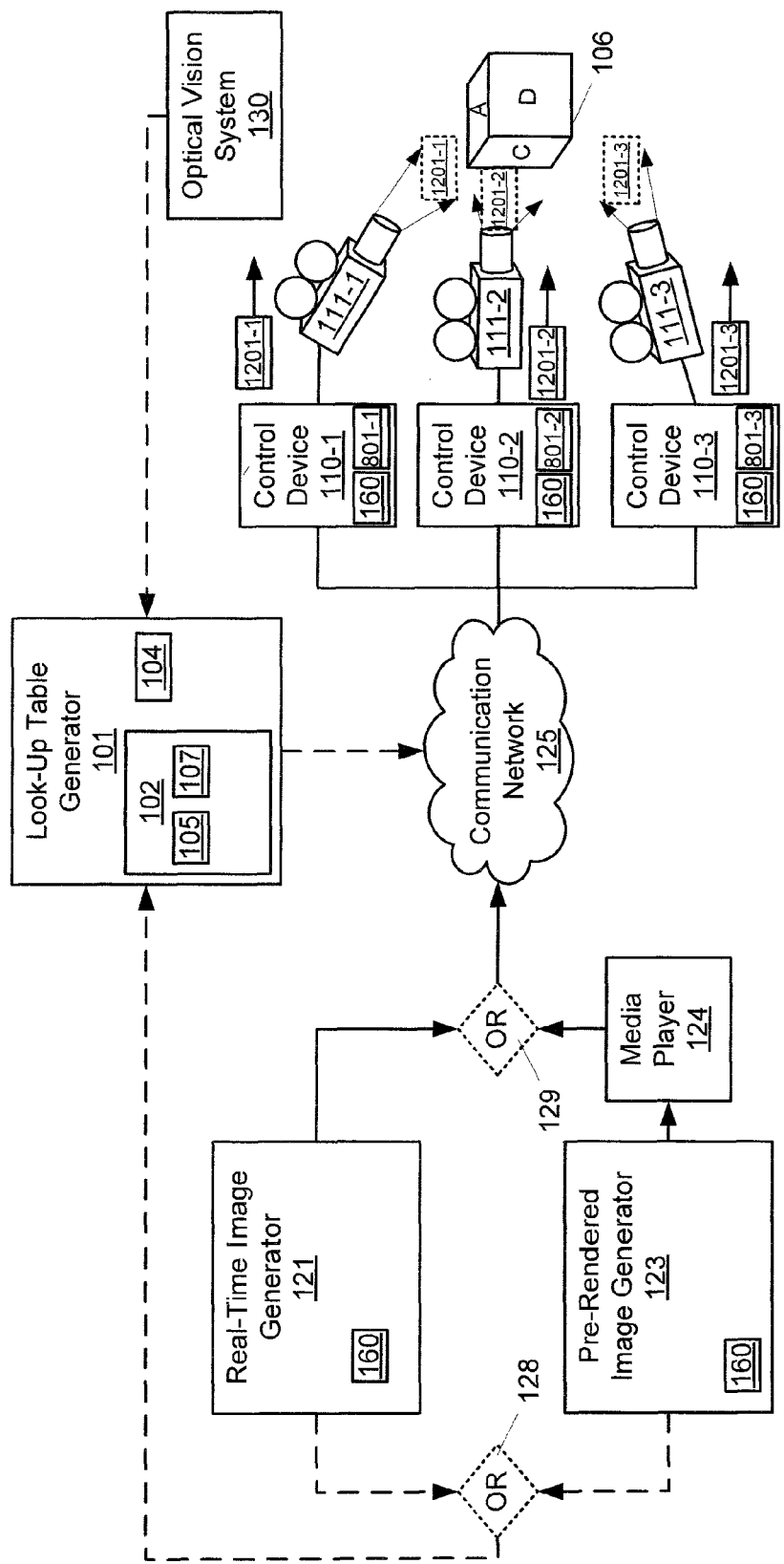
FIG. 13 depicts the system of FIG. 1 projecting respective projection mapped images onto a physical object, according to non-limiting implementations.

For example, attention is next directed to FIG. 13 which depicts each of control devices 110 generating a respective image 1201-1, 1201-2, 1201-3 (interchangeably referred to hereafter, collectively, as images 1201 and, generically, as an image 1201), and controlling a respective projector 111 to project a respective image 1201 onto physical object 106. Each respective image 1201 is generated using a respective lookup table 801, which was in turn generated using respective projector data 301, 3D model 105 and mapping 107, as described above. While not depicted, each respective image 1201 can be multiplied by a respective blending image as described above.

Figure 14:
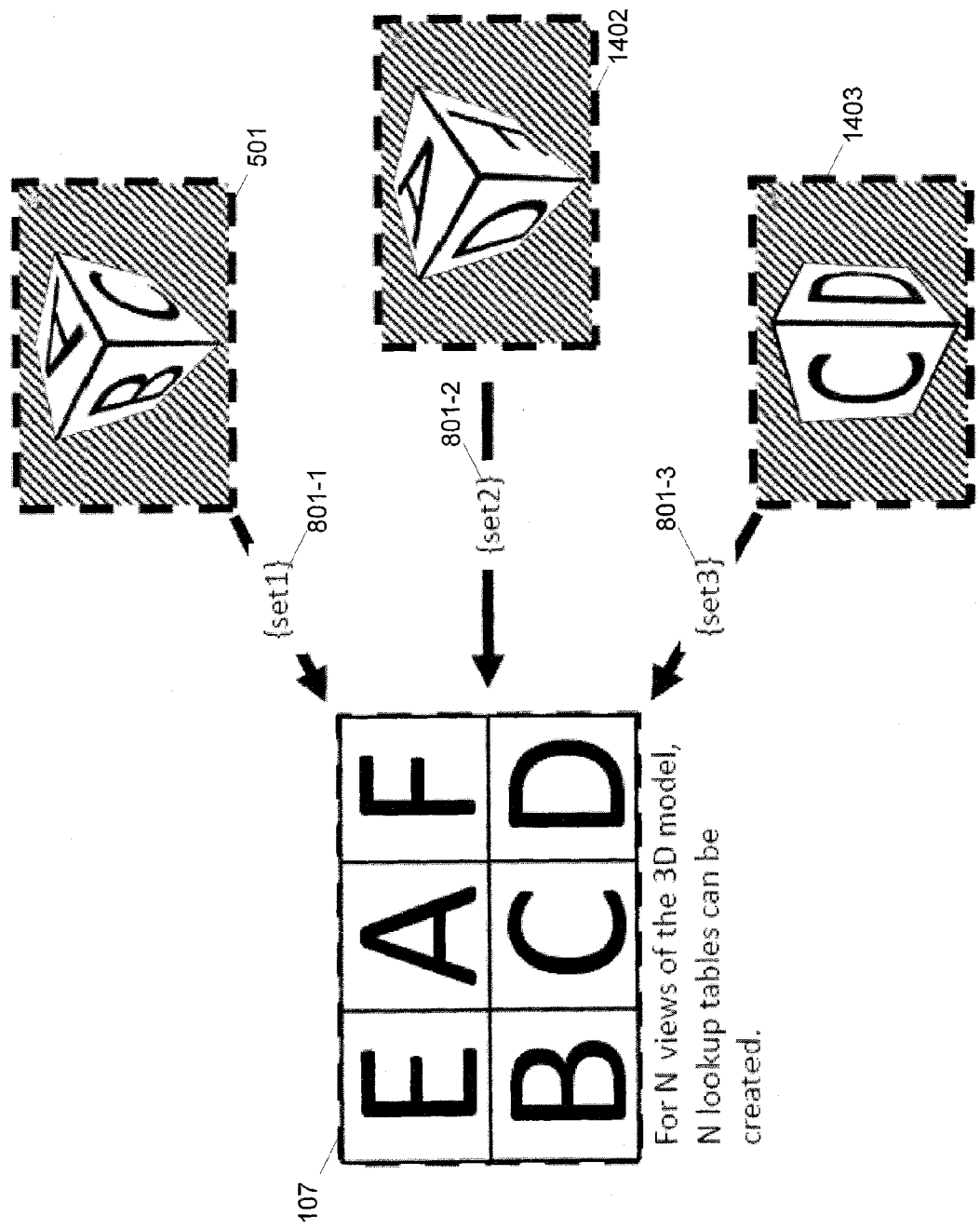
FIG. 14 depicts a summary of lookup table generation for the three projectors of the system of FIG. 1, according to non-limiting implementations.

The process is summarized in FIG. 14, which schematically depicts generation of respective lookup tables 801 from each of view 501 of projector 111-1, a view 1402 of projector 111-2, a view 1403 of projector 111-3, and a mapping 107. View 1402 shows an example view of projector 111-2, and view 1403 shows an example view of projector 111-3 each of which are generated from respective projector data 301, as described above. Hence, each lookup table 801 comprises a respective mapping of projector pixels to unwrapped 2D surfaces of 3D model 105, respective to a given projector 111; as depicted, each lookup table 801 can comprise a set of data points (e.g. "{set1}", "{set2}", "{set3}") which defined the respective mapping.

Figure 15:
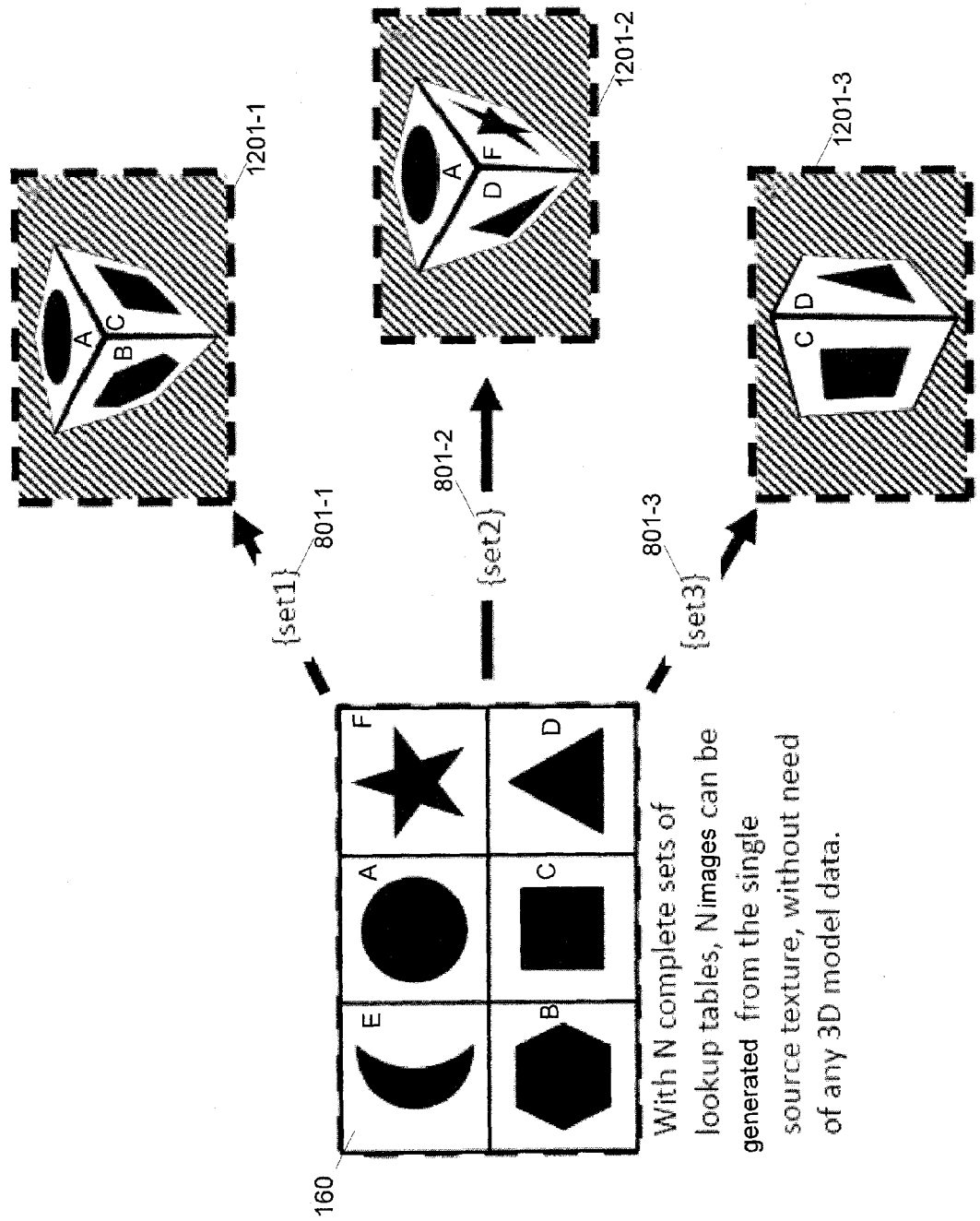
FIG. 15 depicts a summary of image generation using respective lookup tables and a common 2D texture map for each of the three projectors of the system of FIG. 1, according to non-limiting implementations.

The process is further summarized in FIG. 15 which schematically depicts generation of respective images 1201 for each projector 111 using respective lookup tables 801 and 2D texture data 160, with respective surfaces, with respective images of 2D texture data 160 and corresponding surfaces of images 1201 that in turn correspond to surfaces of physical object 106 again indicated using "A", "B", "C", etc. Indeed, with "N" lookup tables 801, one for each of "N" projectors", "N" images 1201 can be generated at control devices 110 with reference to 3D model 105, or without receiving video feeds from one or more of image generators 121, 123 that are customized for each projector 111. While not depicted, each respective image 1201 can be multiplied by a respective blending image as described above; for example, image 1201-1 and image 1201-2 each comprise respective portions to be projected onto surface "A" of physical object 106; hence, the respective portions to be projected onto surface "A" of physical object 106 can be adjusted for blending. Alternatively, such blending maps, and the like, can be used to adjust one or more images 1201 for brightness uniformity: for example, a flux of light from a projector 111 decreases as distance increases, so images 1201 can be adjusted for brightness using blending techniques so that surfaces of physical object 106 are lit uniformly.

As described above, one or more of image generators 121, 123 can be configured to generate 2D texture data 160 comprising images associated with each of unwrapped 2D surfaces of 3D model 105 and transmit 2D texture data 160 to each of one or more control devices 110 associated, in a one-to-one relationship, with plurality of projectors 111, the one or more control devices 110 including the given control device 110 of method 200, and plurality of projectors 111 including the given projector 111 of method 200.

Hence, when images projected onto physical object 106 are to change and/or comprise video, one or more of image generators 121, 123 can transmit an updated 2D texture map to each of control devices 110 and respective lookup tables 801 are again used to generate updated respective images for projection by respective projectors 111 onto physical object 106. Hence, one or more of image generators 121, 123 can generate and/or transmit a video feed comprising a 2D texture map that can be static and/or change with time, as long as 2D texture map is mapped to static mapping 107. When the 2D texture map is static, each of images 1201 can be generated once; when the 2D texture map is dynamic, each of images 1201 can be updated as the 2D texture map is updated.

Hence, a need to render video at one or more of image generators 121, 123 that is customized for each projector 111 can be obviated. Rather, a common 2D texture map is provided to each control device 110 and the portions of the common 2D texture map that are to be projected onto physical object 106 are selected by a control device 110 using a respective lookup table 801 to generate a respective image 1201, which can greatly simplify the projection mapping process. As such, processing resources in system 100 can be reduced as compared to prior art systems in which customized video feeds are rendered for each projector, for example at one or more of image generators 121, 123, which is also a time-consuming process. Thus, overall cost can be reduced, as compared to such prior art systems as the processing resources used in system 100 can be less expensive than those used in prior art systems. Hence, systems described herein can also be referred to as a projection mapping video pipeline.

Furthermore, when one or more of projectors 111 move and/or physical object 106 moves, projector data 301 can be regenerated (e.g. by optical vision system 130) and one or more of lookup tables 801 can be regenerated at generator 101, and transmitted to one or more respective control devices 110 such that one or more respective images 1201 can be regenerated. In other words, images to be projected by projectors 111 can be regenerated without having to re-render videos customized specifically for the projectors, which again saves time and cost.

Those skilled in the art will appreciate that in some implementations, the functionality of system 100, including generator 101, control devices 110, image generators 121, 123, and optical vision system 130, can be implemented using pre-programmed hardware or firmware elements (e.g., application specific integrated circuits (ASICs), field-programmable gate arrays (FPGAs), electrically erasable programmable read-only memories (EEPROMs), etc.), or other related components. In other implementations, the functionality of system 100, including generator 101, control devices 110, image generators 121, 123, and optical vision system 130, can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive, a flash drive, and the like). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
    a lookup table generator; a memory; a communication interface; and a plurality of control devices, in a one-to-one relationship with a plurality of projectors, each of the plurality of control devices storing 2D texture data, which is common to all of the plurality of control devices,
    the memory storing: a three-dimensional ("3D") model of a physical object; and
    a mapping of the 3D model onto unwrapped two-dimensional ("2D") surfaces of the 3D model;
    the lookup table generator configured to, for each of the plurality of control devices:
        receive respective projector data defining a respective location, a respective orientation and respective lens characteristics associated with an associated given projector, relative to the physical object;

generate a respective lookup table for a respective control device from the 3D model, the mapping and the respective projector data, the respective lookup table comprising a respective mapping of respective projector pixels to the unwrapped 2D surfaces of the 3D model, for the respective associated projector; and, transmit, using the communication interface, the respective lookup table from the lookup table generator to the respective control device in communication with a respective projector.

2. The system of claim 1, wherein the lookup table generator is further configured to generate the respective lookup table by: determining, from the 3D model and the mapping, for the respective projector pixels in a view of the respective projector, source coordinates of a texture map, the view determined from the respective projector data.

3. The system of claim 1, wherein the lookup table generator is further configured to generate the respective lookup table taking into account one or more of blending and warping.

4. The system of claim 1, wherein the 2D texture data comprises images associated with each of the unwrapped 2D surfaces of the 3D model, each of the plurality of control devices further configured to: generate a respective image to be projected onto the physical object by the respective projector by using the respective lookup table to associate portions of the 2D texture data with the respective projector pixels.

5. The system of claim 1, wherein the 3D model comprises one or more of a 3D mesh and a plurality of triangles representing the 3D mesh.

6. The system of claim 1, wherein the respective projector data is received from an optical vision system configured to determine the respective projector data.

7. The system of claim 1, further comprising an input device, and wherein the respective projector data is received from the input device.

8. The system of claim 1, wherein the lookup table generator is further configured to receive the 3D model and the mapping from an image generator.

9. The system of claim 1, further comprising an image generator configured to generate the 2D texture data comprising images associated with each of the unwrapped 2D surfaces of the 3D model and transmit the 2D texture data to each of the plurality of control devices.

10. The system of claim 9, further comprising a computing device comprising the lookup table generator, the memory, the communication interface and the image generator, the computing device in communication with each of the plurality of control devices.

11. The system of claim 9, wherein the image generator comprises a real-time image generator or a pre-rendered image generator.

12. The system of claim 11, wherein when the image generator comprises the pre-rendered image generator, the system further comprises a media player.

13. The system of claim 1, wherein the 2D texture data comprises a baked UV texture map.

14. The system of claim 1, wherein the 2D texture data comprises video.

15. A method comprising:

at a system comprising: a lookup table generator; a memory a communication interface; and a plurality of control devices, in a one-to-one relationship with a plurality of projectors, each of the plurality of control devices storing 2D texture data, which is common to all of the plurality of control devices, the memory storing: a three-dimensional ("3D") model of a physical object; and a mapping of the 3D model onto unwrapped two-dimensional ("2D") surfaces of the 3D model, for each of the plurality of control devices:

receiving, at the lookup table generator, respective projector data defining a respective location, a respective orientation and respective lens characteristics associated with an associated given projector, relative to the physical object;

generating, at the lookup table generator, a respective lookup table for a respective control device from the 3D model, the mapping and the respective projector data, the respective lookup table comprising a respective mapping of respective projector pixels to the unwrapped 2D surfaces of the 3D model, for the respective associated projector; and, transmitting, using the communication interface, the respective lookup table, from the lookup table generator, to the respective control device in communication with a respective projector.

16. The method of claim 15, further comprising generating the respective lookup table by: determining, from the 3D model and the mapping, for the respective projector pixels in a view of the given respective projector, source coordinates of a texture map, the view determined from the respective projector data.

17. The method of claim 15, wherein the 2D texture data comprises images associated with each of the unwrapped 2D surfaces of the 3D model, and the method further comprises, generating, at each of the plurality of control devices, a respective image to be projected onto the physical object by the respective projector by using the respective lookup table to associate portions of the 2D texture data with the respective projector pixels.

18. A non-transitory computer-readable medium storing a computer program, wherein execution of the computer program is for:

at a system comprising: a lookup table generator; a memory a communication interface; and a plurality of control devices, in a one-to-one relationship with a plurality of projectors, each of the plurality of control devices storing 2D texture data, which is common to all of the plurality of control devices, the memory storing: a three-dimensional ("3D") model of a physical object; and a mapping of the 3D model onto unwrapped two-dimensional ("2D") surfaces of the 3D model, for each of the plurality of control devices:

receiving, at the lookup table generator, respective projector data defining a respective location, a respective orientation and respective lens characteristics associated with an associated given projector, relative to the physical object;

generating, at the lookup table generator, a respective lookup table for a respective control device from the 3D model, the mapping and the respective projector data, the respective lookup table comprising a respective mapping of respective projector pixels to the unwrapped 2D surfaces of the 3D model, for the respective associated projector; and, transmitting, using the communication interface, the respective lookup table, from the lookup table generator, to the respective control device in communication with a respective projector.

* * * * *